(12) United States Patent  (10) Patent No.: US 8,292,169 B2
Serjeantson et al.  (45) Date of Patent:  Oct. 23, 2012

(54) CART DEVICE, SYSTEM AND METHOD FOR DETERMINING THE WEIGHT OF EACH ITEM CARRIED

(75) Inventors: Kirk Edward Serjeantson, Markham (CA); Andrew Silerio Vicencio, Barrie (CA); Cameron James Laird, Milton (CA)

(73) Assignee: Purolator Courier Ltd., Mississauga, Ontario (CA)

( * ) Notice: Subject to any disclaimer, the term of this patent is extended or adjusted under 35 U.S.C. 154(b) by 0 days.

(21) Appl. No.: 12/975,854

(22) Filed: Dec. 22, 2010

(65) Prior Publication Data

US 2012/0160906 A1  Jun. 28, 2012

(51) Int. Cl.
G06K 15/00 (2006.01)
G06F 17/00 (2006.01)
(52) U.S. Cl. .................................. 235/383; 235/375
(58) Field of Classification Search .................. 235/375, 235/383
See application file for complete search history.

(56) References Cited

U.S. PATENT DOCUMENTS

| | | |
|---|---|---|
| 833,604 A | 10/1906 | Johnson |
| 1,528,899 A | 3/1925 | Thomas |
| 2,673,729 A | 3/1954 | Murray |
| 2,726,095 A | 12/1955 | Emery |
| 3,181,635 A | 5/1965 | Hale |
| 3,321,035 A | 5/1967 | Tarpley |
| 3,836,755 A * | 9/1974 | Ehrat ............................ 235/383 |
| 4,033,420 A | 7/1977 | De Masters |
| D264,759 S | 6/1982 | Schilling et al. |
| 4,359,099 A | 11/1982 | Henslin |
| 5,739,478 A | 4/1998 | Zefira |
| 5,914,464 A | 6/1999 | Vogel |
| 6,013,880 A | 1/2000 | McFarlane et al. |
| 6,105,867 A * | 8/2000 | Shimizu et al. ................ 235/383 |
| 6,124,554 A | 9/2000 | Muckle et al. |
| 6,150,617 A | 11/2000 | Hart et al. |
| 6,222,137 B1 | 4/2001 | Handford |
| 6,332,098 B2 | 12/2001 | Ross et al. |
| 6,725,206 B1 * | 4/2004 | Coveley ......................... 705/414 |
| 6,983,883 B2 | 1/2006 | Ridling |
| 7,610,248 B1 | 10/2009 | Nowlin et al. |
| 7,650,289 B2 | 1/2010 | Cooper et al. |
| 2004/0249717 A1 * | 12/2004 | Shirasaki ......................... 705/17 |
| 2006/0106742 A1 | 5/2006 | Bochicchio et al. |
| 2006/0264120 A1 * | 11/2006 | Perrier et al. .................. 439/752 |
| 2008/0011836 A1 * | 1/2008 | Adema et al. .................. 235/383 |
| 2008/0231431 A1 * | 9/2008 | Stawar et al. ............... 340/425.5 |
| 2008/0243626 A1 * | 10/2008 | Stawar et al. .................... 705/23 |
| 2008/0277906 A1 | 11/2008 | Dunne et al. |
| 2009/0059004 A1 | 3/2009 | Bochicchio |
| 2009/0228363 A1 * | 9/2009 | Segev .............................. 705/16 |
| 2011/0036907 A1 * | 2/2011 | Connelly ........................ 235/383 |
| 2011/0137715 A1 * | 6/2011 | O'Shea et al. ................ 705/14.4 |

* cited by examiner

*Primary Examiner* — Thien M Le
*Assistant Examiner* — April Taylor
(74) *Attorney, Agent, or Firm* — Fasken Martineau DuMoulin LLP; Kevin E. Holbsche

(57) ABSTRACT

A cart moves items within a facility, each having an identification tag. The cart includes a carriage, a scale, a reader, and processors. The scale measures a cumulative weight of the items on the carriage. The reader reads the tags of the items. The processors determine a weight for each item by a change in the cumulative weight after its transfer to or from the carriage. The weight is stored in a database in association with each item. There is also disclosed a related system and method. Preferably, the cart is located, and its location is applied to each item carried thereby to track the items within the facility.

43 Claims, 17 Drawing Sheets

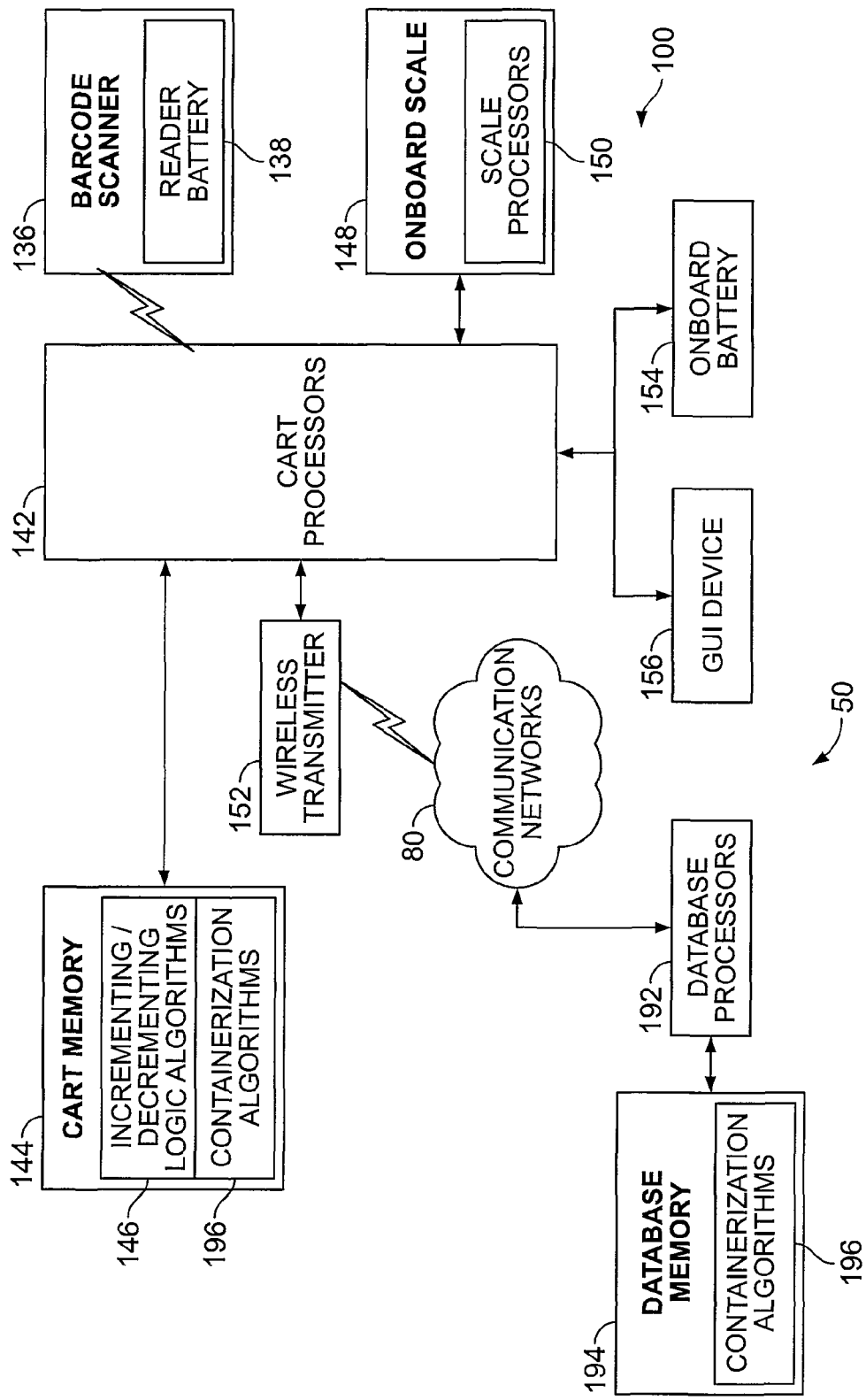

CART DEVICE, SYSTEM AND METHOD FOR DETERMINING THE WEIGHT OF EACH ITEM CARRIED

FIELD OF THE INVENTION

The present invention relates generally to a cart device, system and method for moving items within a facility, and more particularly to a cart device, system and method for determining the weight for each item carried.

BACKGROUND OF THE INVENTION

In the prior art, it may be known to provide carts that can be wheeled manually between locations with one or more lowered walls to facilitate loading, and/or with an integral scale to weigh transported items. The prior art may also include other devices for sensing the cumulative weight of a carried load, as well as the remote transmission and storage of information concerning packages.

Previously, some wheeled devices—see, e.g., U.S. Pat. No. 6,150,617 issued to Hart et al. for a "Vehicle with Weight Sensing" on Nov. 21, 2000—may have been provided with a processor to output and display a carried bulk payload's cumulative weight and/or a rate of change of the bulk payload's weight. Perhaps notably, however, such previous devices may not have been adapted to fix and/or assign any particular rate of change, neither temporally nor spatially, to any particular part or aspect of the bulk payload. Previous devices of this nature may not allow accurate determination of which rate of weight change may have been owing to which part, or parts, of a bulk payload. It should perhaps be clear, from the foregoing, that art related to the transport of bulk payloads should perhaps not be considered directly analogous, nor as prior art in relation, to the shipment of packages.

What may be needed is a cart for contemporaneously moving numerous packages within a facility which provides for an incremental and/or decrementing calculation of the weight for each package carried thereby. It may be advantageous to provide such a cart with an onboard processor to analyze the cumulative weight of numerous packages which may be carried by the cart, and to incrementally and/or decrementally assess the individual weight of each package when it is transferred to and/or from the cart. There may also be some advantage to providing such a cart with an onboard power source, a scanning device to read information concerning each package carried thereby, and/or a display which digitally displays the weight of each package carried by the cart.

One of the objectives of the present invention may be to provide a cart device, system and/or method for moving items within a facility One of the objectives of an aspect of the present invention may be to provide a cart device, system and/or method for determining the weight for each item carried.

One of the objectives of an aspect of the present invention may be to provide a cart device, system and/or method for moving freight items across a warehouse.

One of the objectives of an aspect of the present invention may be to provide a cart device with configurations which may include a tree cart, a flat bed, and/or a caged bin.

One of the objectives of an aspect of the present invention may be to provide a cart device, system and/or method adapted to enable scanning of freight items and/or carts to derive tracking events.

One of the objectives of an aspect of the present invention may be to provide a cart device, system and/or method adapted to enable events (e.g., cart tracking events) to be applied to items (e.g., all items) carried by a cart.

One of the objectives of an aspect of the present invention may be to provide a cart device, system and/or method adapted to enable real-time visibility scans to be performed of the items carried by a cart.

One of the objectives of an aspect of the present invention may be to provide a cart device, system and/or method adapted to enable capture of item attributes for additional charges and/or recovery.

One of the objectives of an aspect of the present invention may be to provide a cart device, system and/or method adapted to capture reweigh through an embedded scale (e.g., the scale may, according to some embodiments of the invention, be a floor scale).

One of the objectives of an aspect of the present invention may be to provide a cart device, system and/or method adapted to enable manual input of item dimensions.

One of the objectives of an aspect of the present invention may be to provide a cart device, system and/or method adapted to enable manual input of assessorial attributes and/or characteristics for carried items.

One of the objectives of an aspect of the present invention may be to provide a cart device, system and/or method adapted to merge scan and recovery data for transmission to and/or integration with tracking and billing functions within a larger operation, for example, at the facility or across many facilities.

One of the objectives of an aspect of the present invention may be to provide a cart device, system and/or method adapted to be mobile and/or cordless.

One of the objectives of an aspect of the present invention may be to provide a cart device, system and/or method adapted for use in parcel delivery or postal applications, for transport of non-conveyable freight items or bulk freight items that bypass conveyors to trailers, for transport of parcels where no conveyor exists, and/or to improve or facilitate specialized sorts (e.g., dangerous goods, air sorts), skid breakdown or build, or reweigh and movement of specific and applicable freight.

One of the objectives of an aspect of the present invention may be to provide a cart device, system and/or method adapted for use in airports or with airlines, for use with baggage trolleys, and/or to improve or facilitate weighing and movement of oversized baggage or air cans.

One of the objectives of an aspect of the present invention may be to provide a cart device, system and/or method adapted for use in supply chain management, pick and pack or reverse pick and pack operations, and/or weigh and movement of products (e.g., regular and oversized products).

One of the objectives of an aspect of the present invention may be to provide a cart device, system and/or method adapted for use in grocery stores, weigh and movement of produce, and/or inventory management.

It is an object of the present invention to obviate or mitigate one or more of the aforementioned mentioned disadvantages and/or shortcomings associated with the prior art, to provide one of the aforementioned needs, and/or to achieve one or more of the aforementioned objects of the invention.

SUMMARY OF THE INVENTION

According to the invention, there is disclosed a cart for moving items within a facility. The cart is for use with a database of information associated with the items. Each of the items has a unique identification tag. The cart includes a mobile carriage assembly, an onboard scale, an identification reader, and one or more processors. The mobile carriage assembly is adapted to carry and move the items. The onboard scale is adapted to measure a cumulative weight of the items carried by the mobile carriage assembly. The identification reader is adapted to read the identification tag of one of the items. The processors are adapted to automatically determine an item weight of the aforesaid one of the items by a change in the cumulative weight after the aforesaid one of the items is transferred to or from the mobile carriage assembly. The item weight is transmitted for storage in the database in association with the aforesaid one of the items.

According to an aspect of one preferred embodiment of the invention, preferably when the aforesaid one of the items is to be transferred to the mobile carriage assembly, the identification reader is adapted to preferably, but not necessarily, read the identification tag before the aforesaid one of the items is transferred to the mobile carriage assembly.

According to an aspect of one preferred embodiment of the invention, preferably when the aforesaid one of the items is transferred from the mobile carriage assembly, the identification reader is adapted to preferably, but not necessarily, read the identification tag after the aforesaid one of the items is transferred from the mobile carriage assembly.

According to an aspect of one preferred embodiment of the invention, the cart may preferably, but need not necessarily, include an onboard battery to power the processors.

According to an aspect of one preferred embodiment of the invention, the onboard battery may preferably, but need not necessarily, be rechargeable.

According to an aspect of one preferred embodiment of the invention, the mobile carriage assembly may preferably, but need not necessarily, include a plurality of low friction castors, preferably to enable rollable movement of the cart.

According to an aspect of one preferred embodiment of the invention, the identification reader may preferably, but need not necessarily, be a handheld identification reader.

According to an aspect of one preferred embodiment of the invention, the identification reader may preferably, but need not necessarily, be a barcode scanner.

According to an aspect of one preferred embodiment of the invention, the cart may preferably, but need not necessarily, include a handle, preferably to move and direct the mobile carriage assembly, and/or a cradle, preferably located near the handle, and preferably to removably receive and/or hold the identification reader.

According to an aspect of one preferred embodiment of the invention, the identification reader may preferably, but need not necessarily, include a rechargeable reader battery. The cradle may preferably, but need not necessarily, be adapted to charge the rechargeable reader battery, preferably when the cradle receives the identification reader.

According to an aspect of one preferred embodiment of the invention, preferably for the aforesaid one of the items, the identification reader may preferably, but need not necessarily, wirelessly communicate the identification tag to the processors.

According to an aspect of one preferred embodiment of the invention, the cart may preferably, but need not necessarily, include a wireless transmitter, preferably to wirelessly transmit the item weight for remote storage in the database.

According to an aspect of one preferred embodiment of the invention, the cart may preferably, but need not necessarily, include a graphical user interface device, preferably mounted to the mobile carriage assembly. The graphical user interface device may preferably, but need not necessarily, enable display and/or input of the item weight and/or other item data associated with the aforesaid one of the items.

According to an aspect of one preferred embodiment of the invention, the other item data may preferably, but need not necessarily, include dimensional data, origin data, destination data, delivery data, and/or handling data.

According to an aspect of one preferred embodiment of the invention, the other item data may preferably, but need not necessarily, be transmitted to and/or received from the database.

According to an aspect of one preferred embodiment of the invention, the graphical user interface device may preferably, but need not necessarily, display a total number of the items (a) which are carried by the mobile carriage assembly, (b) for which the cumulative weight has been measured, and/or (c) for which the identification tag has been read.

According to an aspect of one preferred embodiment of the invention, the total number may preferably, but need not necessarily, be transmitted to the database.

According to an aspect of one preferred embodiment of the invention, the graphical user interface device may preferably, but need not necessarily, include a touchscreen.

According to an aspect of one preferred embodiment of the invention, the cart may preferably, but need not necessarily, include at least one memory for local storage of at least a part of the database.

According to an aspect of one preferred embodiment of the invention, the mobile carriage assembly may preferably, but need not necessarily, include a bin having a bottom portion to carry the items, and/or one or more sidewall portions, preferably extending upwardly from the bottom portion.

According to an aspect of one preferred embodiment of the invention, the bin may preferably, but need not necessarily, have at least two of the sidewall portions. Preferably, at least one of the sidewall portions may extend lower than another one of the side wall portions, preferably to facilitate loading and/or unloading of the items carried by the mobile carriage assembly.

According to an aspect of one preferred embodiment of the invention, the bin may preferably, but need not necessarily, have four of the sidewall portions. Two of the sidewall portions may preferably, but need not necessarily, extend lower than the other two, preferably to facilitate loading and/or unloading of the items carried by the mobile carriage assembly.

According to an aspect of one preferred embodiment of the invention, the aforesaid two of the sidewall portions may preferably, but need not necessarily, be adjacent to one another, preferably to facilitate loading and/or unloading of the items carried by the mobile carriage assembly.

According to an aspect of one preferred embodiment of the invention, the sidewall portions may preferably, but need not necessarily, be constructed from a mesh material, preferably to facilitate visual inspection of the items carried by the mobile carriage assembly.

According to an aspect of one preferred embodiment of the invention, the mobile carriage assembly may preferably, but need not necessarily, include an unwalled flat bed portion, preferably to carry the items.

According to an aspect of one preferred embodiment of the invention, the mobile carriage assembly may preferably, but need not necessarily, include an A-shaped supporting rack, preferably to carry the items.

According to the invention, there is also disclosed a system for moving items within a facility. The system includes a unique identification tag associated with each of the items, a database of information associated with the items, and at least one cart. The cart includes a mobile carriage assembly, an onboard scale, an identification reader, and one or more processors. The mobile carriage assembly is adapted to carry and move the items. The onboard scale is adapted to measure a cumulative weight of the items carried by the mobile carriage assembly. The identification reader is adapted to read the identification tag associated with one of the items. The processors are adapted to automatically determine an item weight of the aforesaid one of the items by a change in the cumulative weight after the aforesaid one of the items is transferred to or from the mobile carriage assembly. The cart transmits the item weight for storage in the database in association with the aforesaid one of the items.

According to an aspect of one preferred embodiment of the invention, the database may preferably, but need not necessarily, include the item weight and/or other item data associated with the aforesaid one of the items. The cart may preferably, but need not necessarily, include a graphical user interface device, preferably mounted to the mobile carriage assembly. The graphical user interface device may preferably, but need not necessarily, enable retrieval from the database, and/or display, of the item weight and/or the other item data associated with the aforesaid one of the items.

According to an aspect of one preferred embodiment of the invention, the other item data may preferably, but need not necessarily, include dimensional data, origin data, destination data, delivery data, and/or handling data associated with the aforesaid one of the items.

According to an aspect of one preferred embodiment of the invention, the system may preferably, but need not necessarily, include a database processor which may preferably, but need not necessarily, be located remotely from the cart. The database processor may preferably, but need not necessarily, be adapted to receive cart location data for the cart, preferably in order to automatically determine item location data, preferably for each aforesaid one of the items carried by the cart. The database may preferably, but need not necessarily, store the item location data in association with each aforesaid one of the items carried by the cart, preferably to enable tracking of the items within the facility.

According to the invention, there is also disclosed a method of transferring items to and from a cart for moving the items within a facility. Each of the items has a unique identification tag. The cart is provided with a mobile carriage assembly, an identification reader, an onboard scale, and one or more processors. The method is for use with a database of information associated with the items. The method includes an identification step, a transfer step, a weighing step, a calculation step after the weighing step, and a transmission step after the calculation step. In the identification step, the identification reader is used to read the identification tag of one of the items. In the transfer step, the aforesaid one of the items is transferred to or from the mobile carriage assembly. In the weighing step, the onboard scale is used to automatically measure a cumulative weight of the items carried by the mobile carriage assembly before and after the transfer step. In the calculation step, the processors are used to automatically determine an item weight of the aforesaid one of the items by a change in the cumulative weight after the transfer step. In the transmission step, the item weight is transmitted for storage in the database in association with the aforesaid one of the items.

According to an aspect of one preferred embodiment of the invention, preferably when the aforesaid one of the items is transferred to the mobile carriage assembly, the identification step may preferably, but need not necessarily, be performed before the transfer step.

According to an aspect of one preferred embodiment of the invention, preferably when the aforesaid one of the items is transferred from the mobile carriage assembly, the identification step may preferably, but need not necessarily, be performed after the transfer step.

According to an aspect of one preferred embodiment of the invention, preferably after the identification step and/or before the calculation step, the identification reader may preferably, but need not necessarily, wirelessly communicate the identification tag to the processors.

According to an aspect of one preferred embodiment of the invention, preferably in the transmission step, a wireless transmitter (preferably provided on the cart) may preferably, but need not necessarily, wirelessly transmit the item weight for remote storage in the database.

According to an aspect of one preferred embodiment of the invention, the method may preferably, but need not necessarily, include a display/input step, preferably after the identification step. In the display/input step, a graphical user interface device (preferably mounted to the mobile carriage assembly) may preferably, but need not necessarily, be used to display and/or input the item weight and/or other item data associated with the aforesaid one of the items.

According to an aspect of one preferred embodiment of the invention, preferably in the display/input step, the other item data may preferably, but need not necessarily, include dimensional data, origin data, destination data, delivery data, and/or handling data.

According to an aspect of one preferred embodiment of the invention, the other item data may preferably, but need not necessarily, be transmitted to the database, preferably in the transmission step, and/or received from the database, preferably in the display/input step.

According to an aspect of one preferred embodiment of the invention, preferably in the display/input step, the graphical user interface device may preferably, but need not necessarily, display a total number of the items (a) which are carried by the mobile carriage assembly, (b) for which the cumulative weight has been measured, and/or (c) for which the identification tag has been read.

According to an aspect of one preferred embodiment of the invention, preferably in the transmission step, the total number may preferably, but need not necessarily, be transmitted to the database.

According to an aspect of one preferred embodiment of the invention, preferably in the transmission step, at least a part of the database may preferably, but need not necessarily, be locally stored in at least one memory which may preferably, but need not necessarily, be provided onboard the cart.

According to an aspect of one preferred embodiment of the invention, the mobile carriage assembly may preferably, but need not necessarily, be provided with a bin which may preferably, but need not necessarily, have a bottom portion to carry the items and/or at least two sidewall portions, preferably extending upwardly from the bottom portion. At least one of the sidewall portions may preferably, but need not necessarily, extend lower than another one of the side wall portions. Preferably in the transfer step, the aforesaid one of the items may preferably, but need not necessarily, be transferred over the aforesaid at least one of the sidewall portions, preferably to facilitate transfer of the aforesaid one of the items to and/or from the mobile carriage assembly.

According to an aspect of one preferred embodiment of the invention, the bin may preferably, but need not necessarily, have four of the sidewall portions. Two adjacent ones of the sidewall portions may preferably, but need not necessarily, extend lower than the other two. Preferably in the transfer step, the aforesaid one of the items may preferably, but need not necessarily, be transferred over the aforesaid two adjacent ones of the sidewall portions, preferably to facilitate transfer of the aforesaid one of the items to and/or from the mobile carriage assembly.

According to an aspect of one preferred embodiment of the invention, the sidewall portions may preferably, but need not necessarily, be constructed from a mesh material. The method may preferably, but need not necessarily, include an inspection step of conducting a visual inspection, preferably through the mesh material, of the items carried by the mobile carriage assembly.

According to an aspect of one preferred embodiment of the invention, the method may preferably, but need not necessarily, include a cart locating step, a database processing step and/or a database storage step. Preferably in the cart locating step, a database processor (preferably located remotely from the cart) may preferably, but need not necessarily, be used to receive cart location data for the cart. Preferably in the database processing step, the cart location data and/or the database processor may preferably, but need not necessarily, be used to automatically determine item location data for each aforesaid one of the items carried by the cart. Preferably in the database storage step, the item location data may preferably, but need not necessarily, be stored in the database in association with each aforesaid one of the items carried by the cart, preferably to enable tracking of the items within the facility.

Other advantages, features and characteristics of the present invention, as well as methods of operation and functions of the related elements of the cart, system and method, and the combination of steps, parts and economies of manufacture, will become more apparent upon consideration of the following detailed description and the appended claims with reference to the accompanying drawings, the latter of which are briefly described hereinbelow.

BRIEF DESCRIPTION OF THE DRAWINGS

The novel features which are believed to be characteristic of the cart, system and method according to the present invention, as to their structure, organization, use, and method of operation, together with further objectives and advantages thereof, will be better understood from the following drawings in which presently preferred embodiments of the invention will now be illustrated by way of example. It is expressly understood, however, that the drawings are for the purpose of illustration and description only, and are not intended as a definition of the limits of the invention. In the accompanying drawings:

FIG. 11 is a schematic diagram of selected components of the system of FIG. 10.

DETAILED DESCRIPTION OF THE PREFERRED EMBODIMENTS

Figure 10:
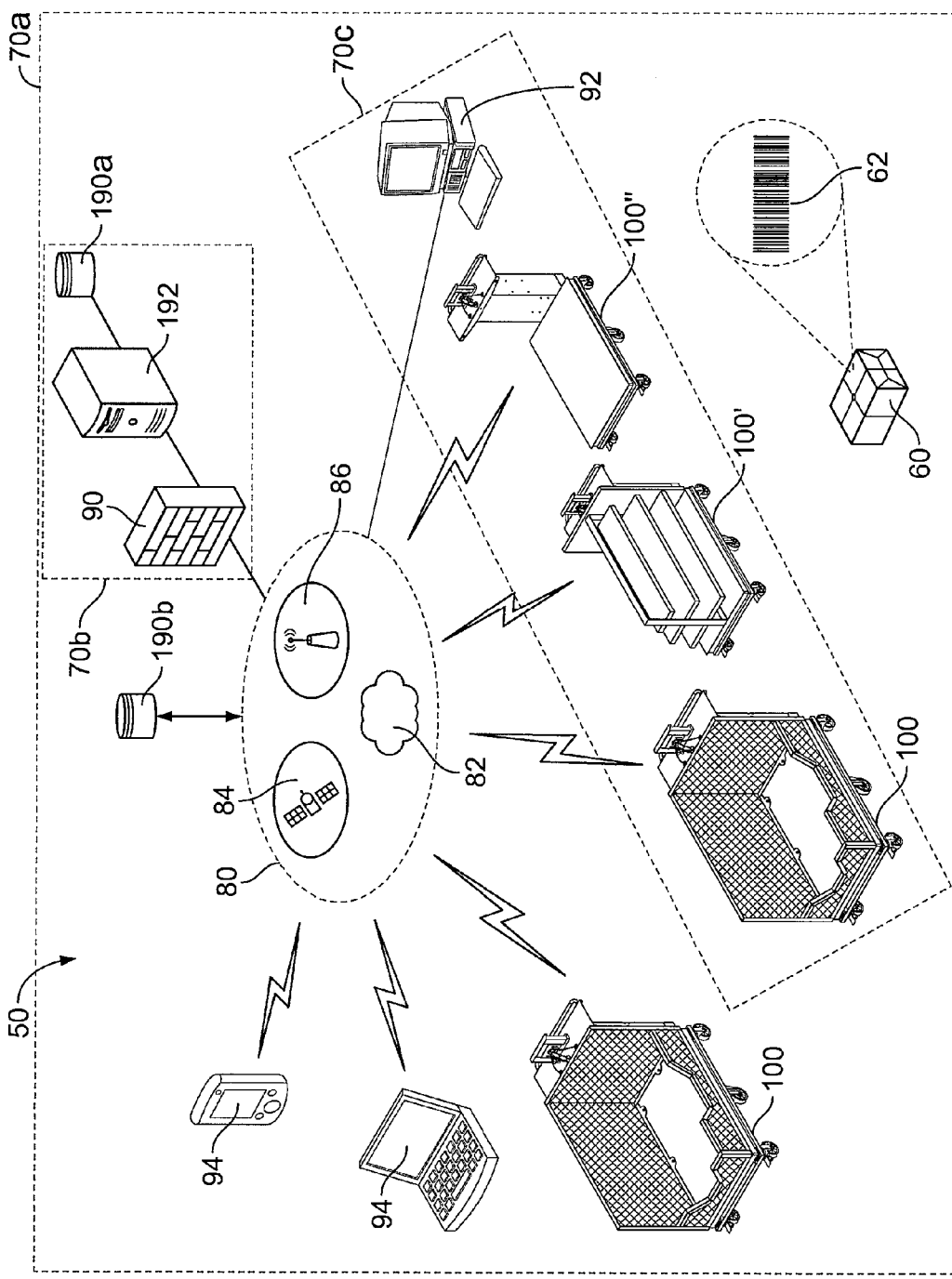
FIG. 10 is a schematic diagram of one system for moving items within a facility according to a preferred embodiment of the invention.

FIG. 10 depicts a system 50 for moving items 60 within a facility 70a and/or multiple facilities 70b, 70c. Each of the items (alternately, herein, "packages" or "parcels") 60 has a unique identification tag 62, preferably, a barcode affixed thereto. The packages 60 preferably constitute freight or other items moving within a mail system 50 or within a distribution system 50 generally. The system 50 is shown in use with one or more communication networks 80, a networked computer 92, and wirelessly networked devices 94. The communications networks 80 may include satellite networks (e.g., GPS networks) 84, terrestrial wireless networks 86, and the Internet 82. Persons having ordinary skill in the art will appreciate that the system 50 includes hardware and software, and possesses bin, ergonomic, visibility and recovery features, among others.

The system 50 includes carts 100, 100', 100" for moving the items 60, a database 190a, 190b, and at least one database processor 192 which is preferably located remotely from the cart 100, 100', 100". The database 190a, 190b includes information associated with the items 60, and all or part of the database 190a, 190b may be located behind a firewall 90 relative to the communications networks 80. Persons having ordinary skill in the art will appreciate that references herein to the database 190a, 190b comprise references to (i) a single database 190a located at a facility 70b remote from, and/or at the same facility 70a, 70c as, the carts 100, 100', 100", and/or (ii) one or more congruent and/or distributed databases 190a, 190b, such as, for example, also including one or more sets of congruently inter-related databases 190a, 190b—possibly distributed across multiple facilities 70a, 70b, 70c.

As shown in FIGS. 1-5, each cart 100 preferably includes a mobile carriage assembly 102, a handle 132, an onboard scale 148, a graphical user interface device 156, a cradle 134, and an identification reader 136. FIG. 11 schematically illustrates, among other things, the onboard scale 148, the graphical user interface device 156, and the identification reader 136 of the cart 100. As shown in FIG. 11, each cart 100 preferably also includes one or more processors 142, a wireless transmitter 152, an onboard battery 154, and at least one onboard (processor-readable) memory 144; and the identification reader 136 includes a rechargeable reader battery 138.

Preferably, the onboard battery 154 is also rechargeable, and it powers the graphical user interface device 156 and the processors 142 (as shown in FIG. 11), as well as the wireless transmitter 152 and the onboard scale 148 (among other things). The onboard battery 154 helps to enable cordless mobility of the cart 100. The onboard battery 154 can preferably run for at least about eight (8) hours on a single charge.

Figure 1:
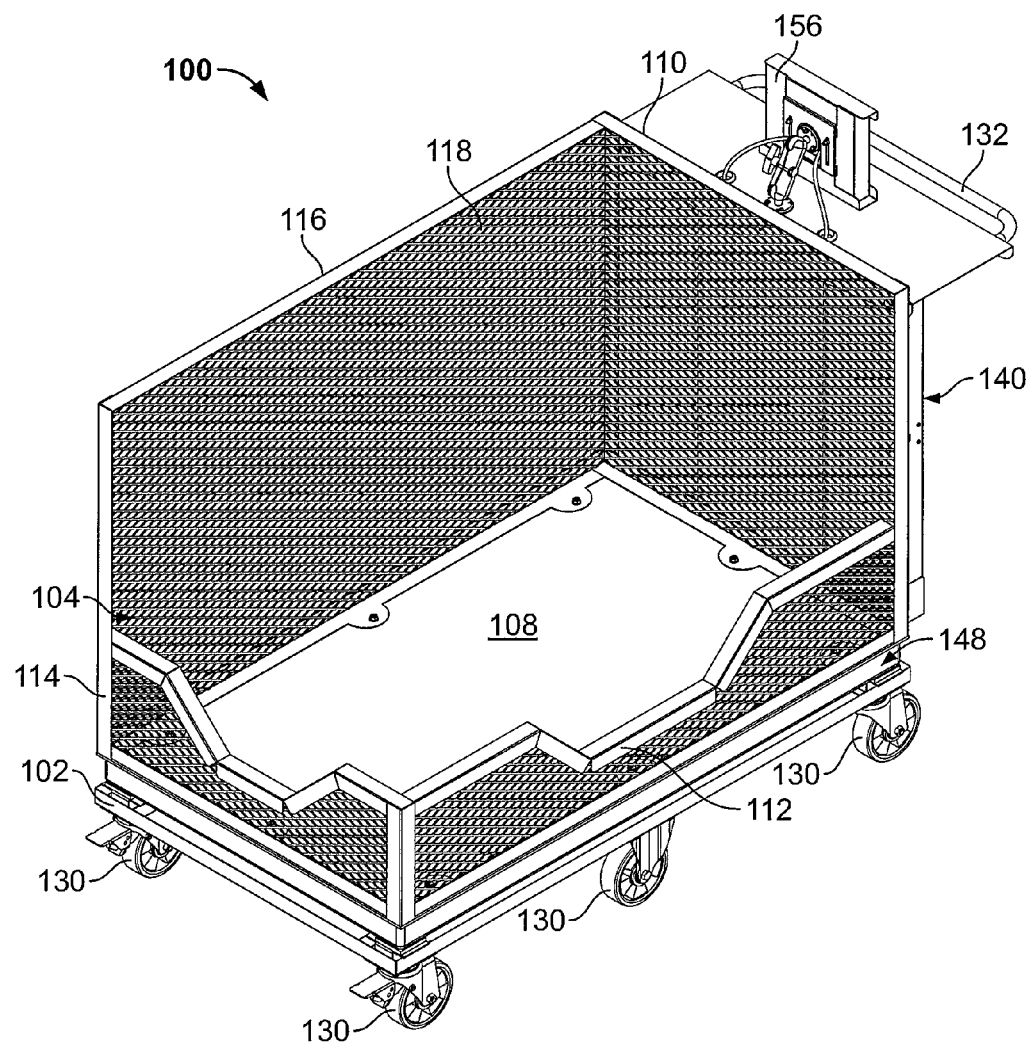
FIG. 1 is a front top left perspective view of a cart provided with a bin according to one preferred embodiment of the invention.
Figure 2:
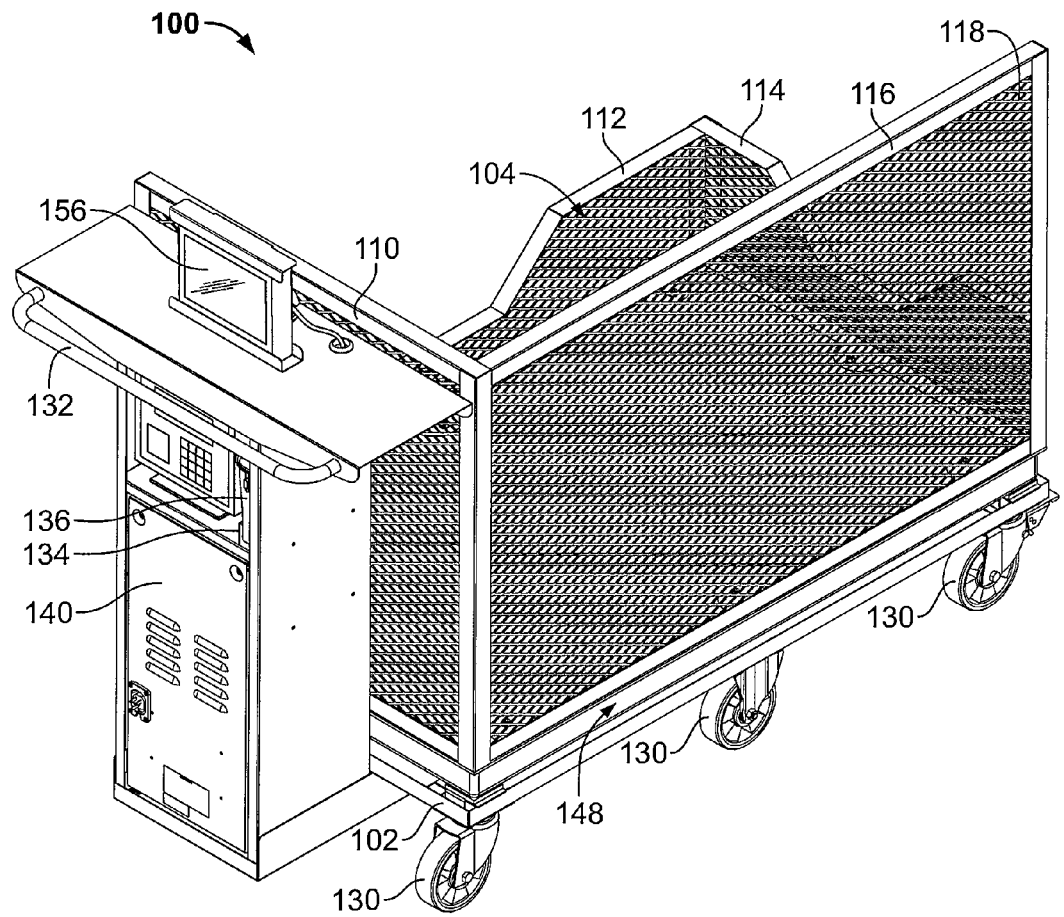
FIG. 2 is a rear top right perspective view of the cart of FIG. 1.
Figure 5:
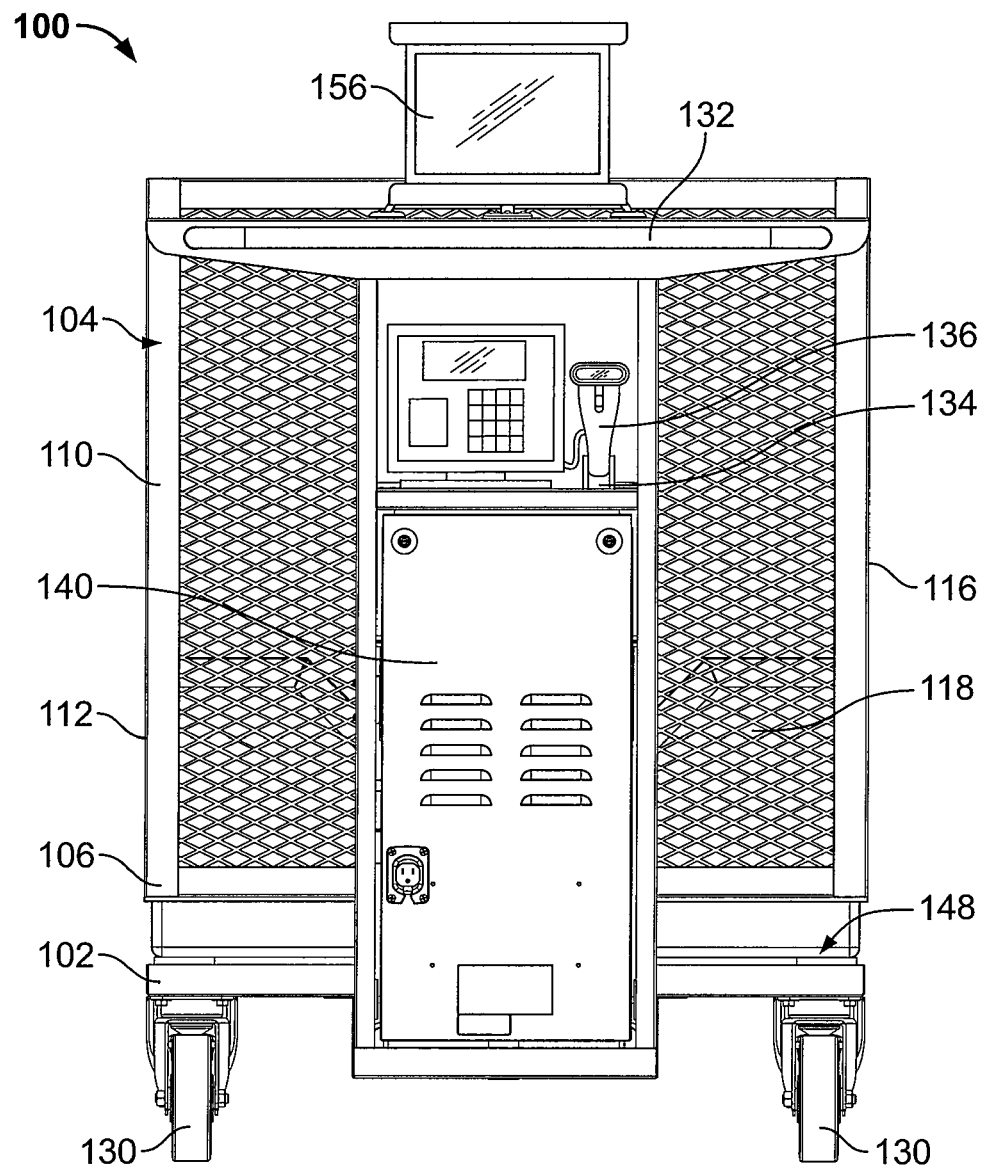
FIG. 5 is a rear elevational view of the cart of FIG. 1.

The handle 132 (best seen in FIG. 2) is used to move and direct the mobile carriage assembly 102. The cradle (or "holster") 134, as shown in FIGS. 2 and 5, is located or mounted near the handle 132, and it removably receives and holds the identification reader 136. The cradle 134 preferably charges the rechargeable reader battery 138 (with power from the onboard battery 154) when the cradle 134 receives the identification reader 136.

The mobile carriage assembly 102 carries and moves the items 60. The mobile carriage assembly 102 is preferably adapted, among other things, for ergonomic use in a parcel delivery network, to move and reweigh freight 60 in a manner that is easier on employees when loading and unloading freight 60.

Figure 3:
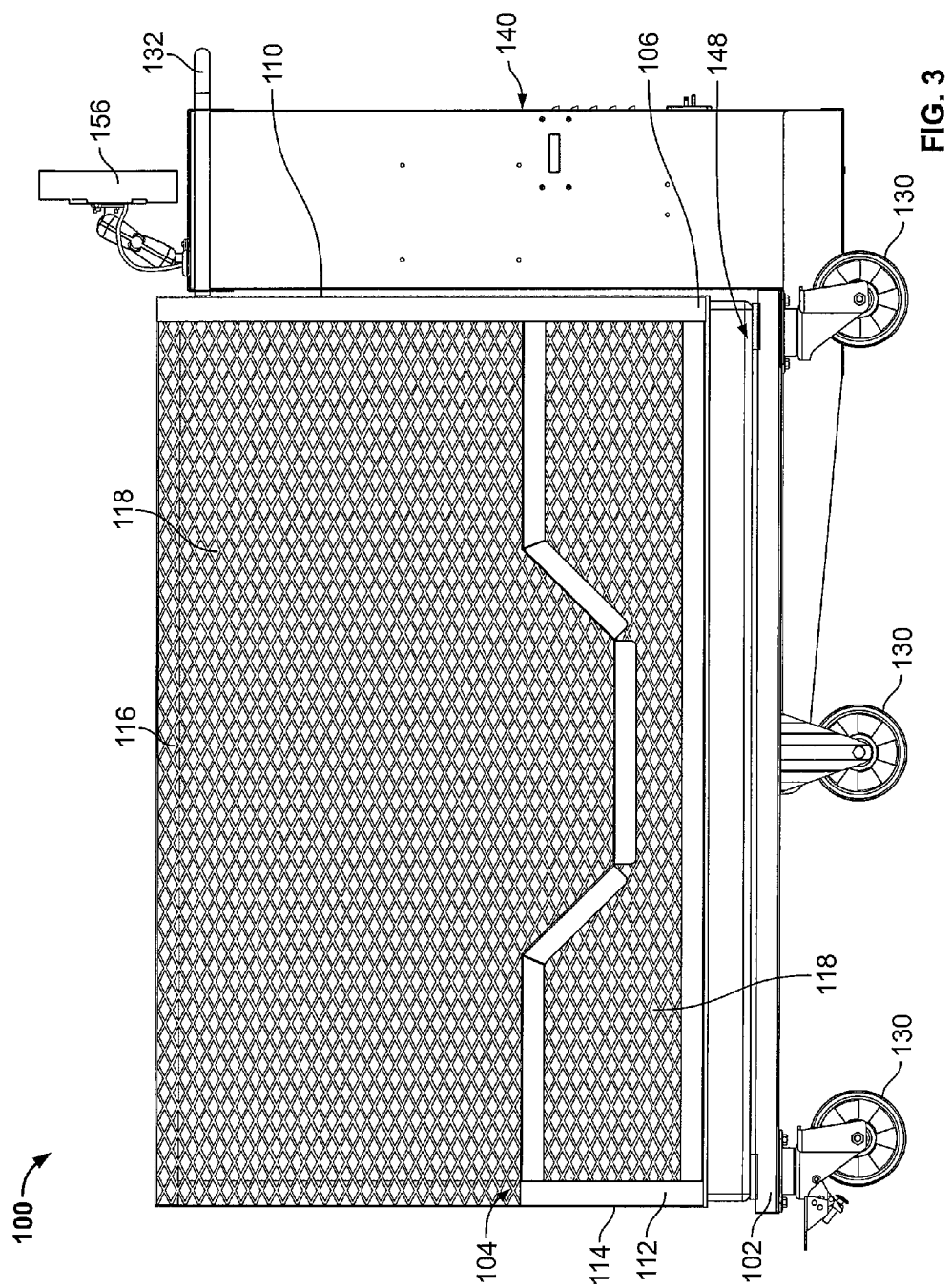
FIG. 3 is a left side elevational view of the cart of FIG. 1.
Figure 4:
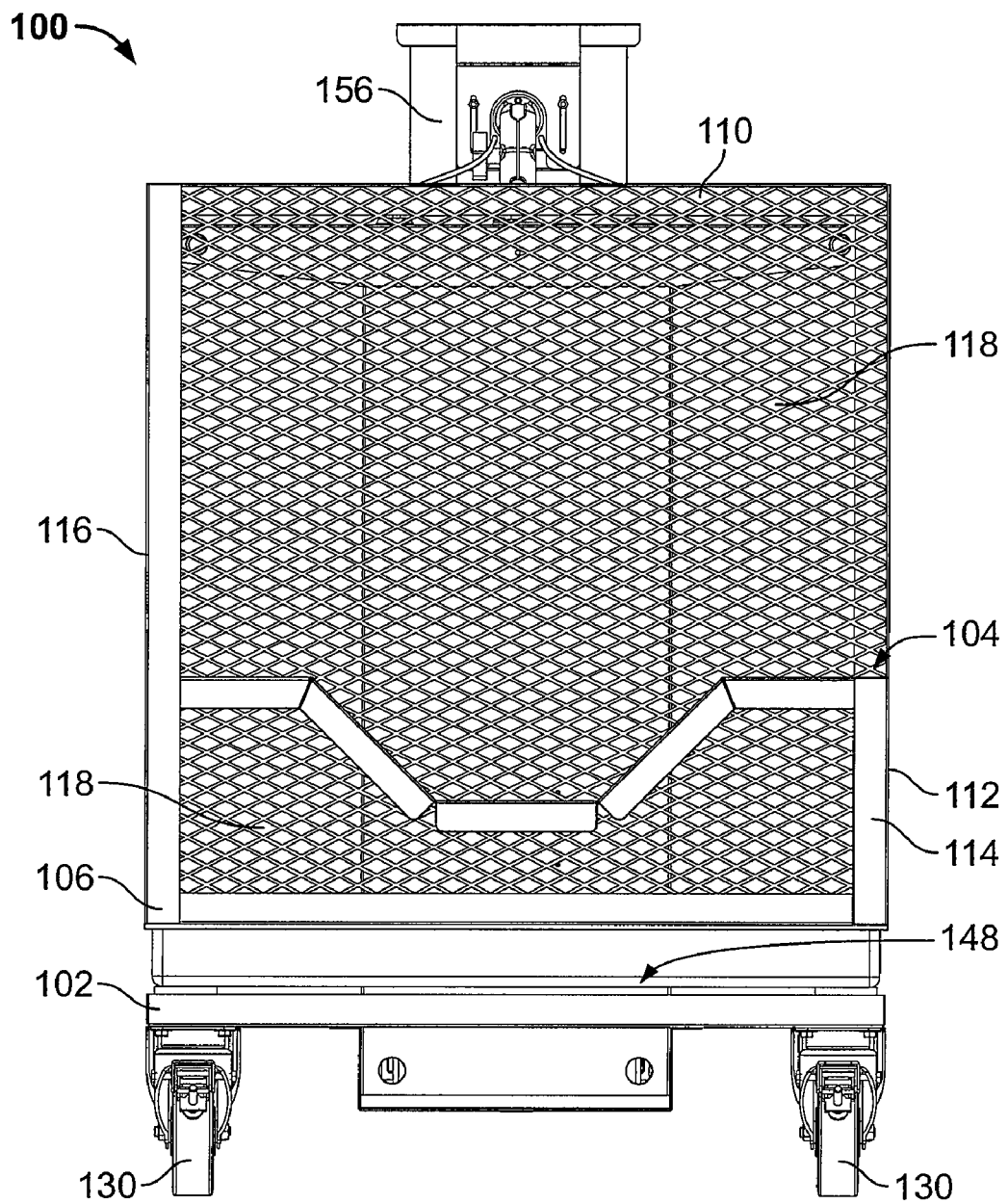
FIG. 4 is a from elevational view of the cart of FIG. 1.

As shown in FIGS. 1-5, the mobile carriage assembly 102 preferably includes and supports an open bin 104 in which the packages 60 can be placed. As shown in FIGS. 3-5, the bin 104 preferably has a bottom portion 106 to carry the items. The bottom portion 106 includes a floor 108 (shown in FIG. 1), and the floor 108 of the bin is preferably supported on the carriage assembly 102. Four sidewall portions 110, 112, 114, 116 extend upwardly from the bottom portion 106. The bin 104 is preferably configured to an optimal size (volume) to handle various freight 60 types, though the bin 104 size and configuration are variable based on the application.

Preferably, and as shown in FIGS. 1-5, two of the sidewall portions 112, 114 (adjacent one another) are lower than the other two 110, 116, to facilitate loading and unloading of items 60—especially, for example, cumbersome packages 60—carried by the mobile carriage assembly 102. Among other things, the low sidewall portions 112, 114 permit easier handling of objects 60—e.g., objects 60 which may have been prescribed not to be lifted higher than about three feet (3 ft.) off the ground. The sidewall portions 110, 112, 114, 116 are preferably constructed from a mesh material 118 to provide a caged bin 104 and facilitate visual inspection of the items 60 carried by the mobile carriage assembly 102.

Figure 6:
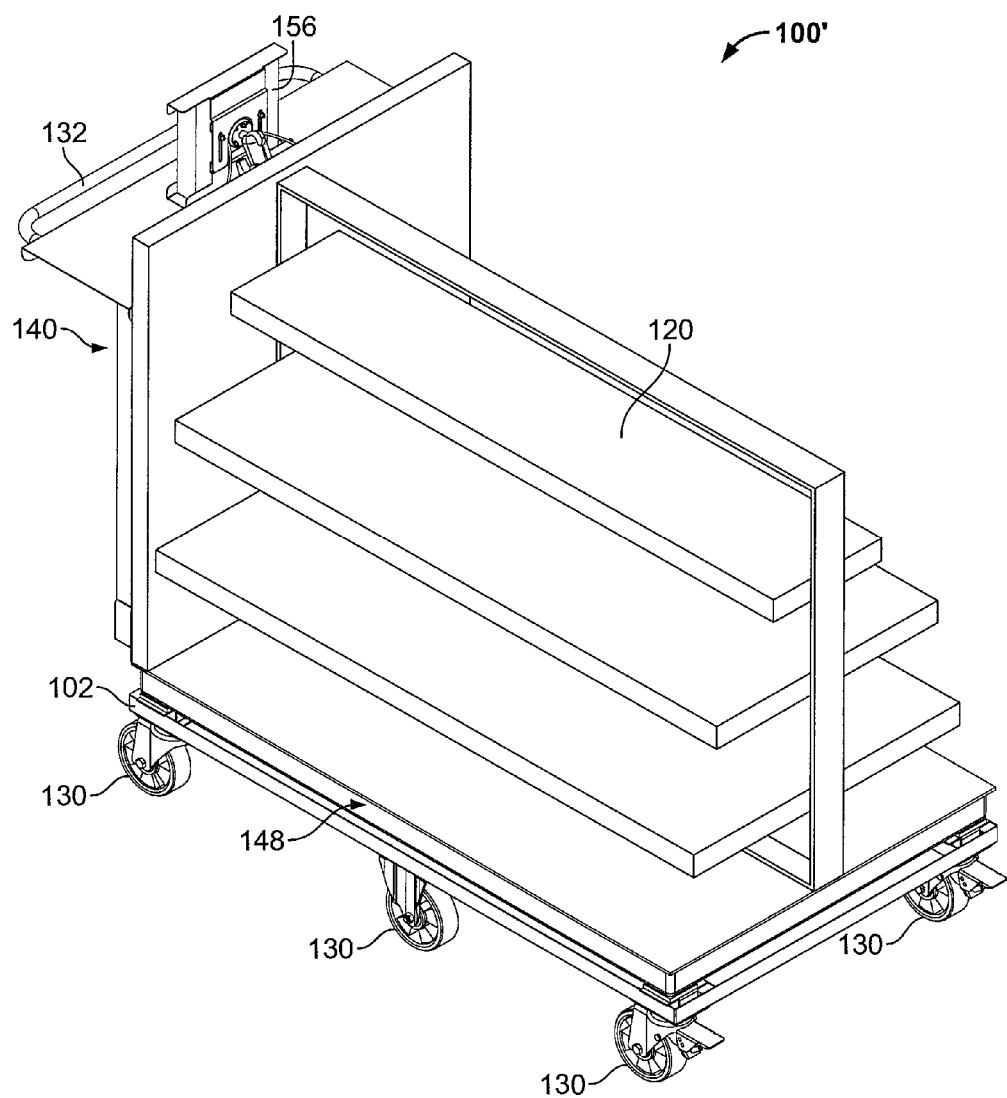
FIG. 6 is a front top right perspective view of a cart provided with a rack according to another preferred embodiment of the invention.
Figure 7:
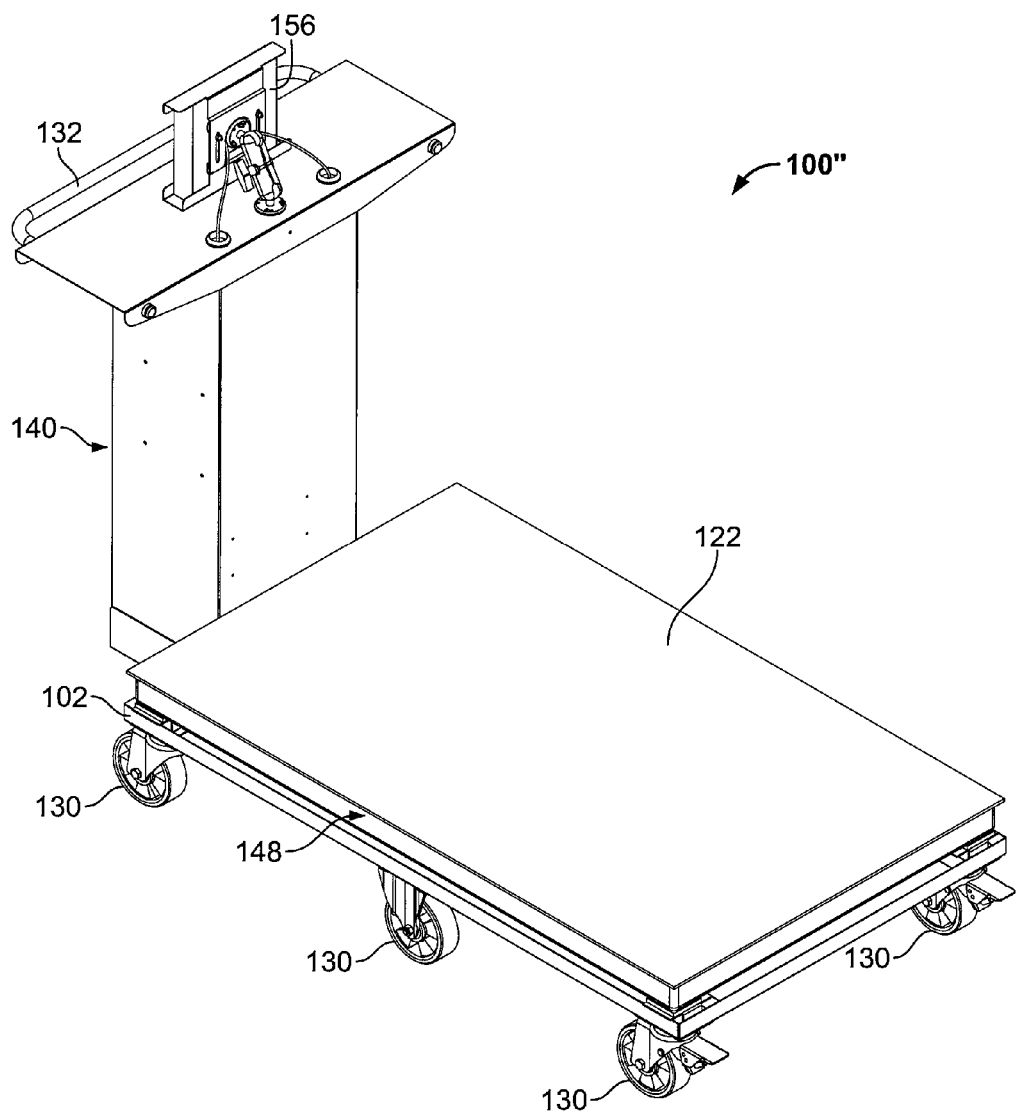
FIG. 7 is a front top right perspective view of a cart provided with a flat bed according to another preferred embodiment of the invention.

In an alternate embodiment of the cart 100' shown in FIG. 6, the mobile carriage assembly 102 may include an A-shaped supporting rack (or "tree cart") 120 to carry the items 60. In another embodiment of the cart 100" shown in FIG. 7, the mobile carriage assembly 102 may include an un-walled flat bed portion 122 to carry the items 60.

As shown in FIGS. 1-5, the mobile carriage assembly 102 also preferably includes a plurality of low friction castors 130 to enable rollable movement of the cart 100. The easily rollable castors 130 make the mobile carriage assembly 102 easier to push. The low friction castors 130 and the handle 132 are such as to facilitate the cart 100 being pushed or pulled, manually, from one point to another. The castors 130 (and their inter-working components) are preferably such as to enable the cart 100 to be movable with less than about six pounds (6 lbs.) of pressure being applied by a user with a load of over about one thousand pounds (1000 lbs.) onboard the cart 100.

The onboard scale 148 measures a cumulative weight 214 (as may be appreciated from a consideration of FIGS. 8H-8N) of the items 60 carried by the mobile carriage assembly 102. The scale 148 is preferably a floor scale integrally provided and built into the bottom 106 of the bin 104 for highly accurate weighing of the packages 60 placed therein. The scale 148 is preferably accurate to government set precision standards, and may preferably be accurate to about one pound (1 lb.), or perhaps more preferably to about one fifth of a pound (0.2 lbs.). It may be adapted to measure a minimum weight of about two pounds (2 lbs.). As shown in FIG. 11, the scale 148 may include a one or more scale processors 150 which electronically communicate with the other processors 142 onboard the cart 100.

The identification reader 136 is preferably a handheld barcode scanner. The scanner 136 can be an imager, or a laser-based scanner. The scanner 136 may preferably fit on and/or be carried by a user's hand. [In some alternate embodiments according to the invention, the identification reader 136 may instead be a radio-frequency identification ("RFID") scanner and/or a hands-free scanner built-in to the cart 100 near its handle 132. When an REID scanner 136 is provided, one or more of the identification tags 62 on the items 60 are RFID tags.] It may be wired to communicate with, or it may wirelessly communicate—e.g., by the Bluetooth proprietary open wireless technology standard which is managed by the Bluetooth Special Interest Group of Kirkland, Wash.—with the processors 142 onboard the cart 100 (e.g., via the wireless transmitter 152). The scanner 136 is adapted to scan or read information concerning each package 60 (e.g., a barcode 62).

Before items 60 are transferred to the mobile carriage assembly 102, and after items 60 are transferred from the mobile carriage assembly 102, the identification reader 136 may preferably be used to read their identification tags 62. Preferably, the identification reader 136 wirelessly communicates the identification tags 62 to the processors 142.

The one or more processors 142 are preferably provided onboard the cart 100. The processors 142 may be embodied within a computer 140—e.g., an industrial PC. The cart 100 is preferably provided with a proper mount to safely secure the processors 142 and/or the computer 140.

The processors 142 automatically determine an item weight 212 (as may be appreciated from a consideration of FIGS. 8M-8N) of each item 60 by a change in the cumulative weight 214 after it is transferred to or from the mobile carriage assembly 102. Preferably, the processors 142 are operatively encoded with one or more algorithms 146 (shown schematically in FIG. 11 as being stored in the memory 144 onboard the cart 100) which provide them with scanner/scale incrementing and decrementing logic. That is, the processors 142 are preferably operatively encoded with one or more incrementing and decrementing logic algorithms 146 which may be stored in the cart's memory 144. Preferably, the incrementing and decrementing logic algorithms 146 enable the processors 142 to assess weight information incrementally/decrementally received from the scale 148, and to accurately attribute a weight 212 to each package 60 placed into the bin 104.

When a package 60 is transferred to the mobile carriage assembly 102, the processors 142 incrementally calculate its weight 212. Skid build—i.e., when freight items or packages 60 are loaded onto a cart (or skid) 100—uses incrementing functionality according to the invention. Each item 60 is scanned and then loaded onto the cart 100 to enable calculation of its weight 212.

When a package 60 is transferred from the mobile carriage assembly 102, the processors 142 de-incrementally (or "decrementally") calculate its weight 212. Skid breakdown—i.e., when freight items or packages 60 are removed from a loaded cart (or skid) 100—uses decrementing functionality according to the invention. Each item 60 is scanned and its weight 212 is calculated after removal from the loaded cart 100.

Some preferred embodiments according to the invention might include the incrementing functionality but not the decrementing functionality, or vice versa, and some might include both of these functionalities—as all of these embodiments lay within the scope of the present invention.

The data/information collected from the scale 148 and the scanner 136 is merged by the processors 142 and the results are wirelessly transmitted to a remote backend 70b (which may or may not be on-site) for billing and tracking purposes. Preferably, the processors 142 onboard the cart 100 are operatively encoded with software algorithms which merge package identification (e.g., barcode) data with the scale weight.

Each item weight 212 is wirelessly transmitted by the wireless transmitter 152 for remote storage in the database 190a, 190b in association with the corresponding item 60. In some embodiments of the invention, the cart 100 may be provided with the memory 144 (shown in FIG. 11) for local storage of all or part of the database 190a, 190b.

The graphical user interface (or "GUI") device 156 is mounted to the mobile carriage assembly 102. The GUI device 156 preferably includes a touchscreen (and the two terms may be used inter-changeably herein). [Still, other forms of GUI device 156 lay within the scope of the present invention, including a display with or without a "point-and-click" mouse or other input device.] As may be appreciated from a consideration of FIGS. 8H-8N, the GUI device 156 enables (selective or automatic) retrieval from the database 190a, 190b, as well as display and input, of the item weight 212 and other item data associated with each of the items 60. The other item data may preferably include dimensional data 218, 220, 222, origin data, destination data, and/or delivery or handling data (e.g., associated services and surcharges) 224, 226, 228, 230, 232 for each item 60. The GUI device 156 may also display package ID numbers 210 (as shown in FIGS. 8I-8N). As shown in FIGS. 8H-8N, the GUI device 156 preferably also displays a total number 216 of the items 60 (a) which are carried by the mobile carriage assembly 102, (b) for which the cumulative weight 214 has been measured, and/or (c) for which the identification tag 62 has been read. In some embodiments of the invention, the GUI device 156 may also display the current time and date. According to some preferred embodiments of the invention, and as best seen in FIGS. 8M-8N, the GUI device 156 may preferably display package identification numbers 210 scanned with weight appended, any services applied 224, 226, 228, 230, 232, a special handling surcharge (SHS) application button 168, and the total number 216 of pieces 60 scanned and/or weighed. The GUI device 156 may also display the current time and/or date, and a configurable parcel delivery network location.

The cart 100 also enables capture and "recovery" of attributes for additional charges. For example, as may be appreciated from a consideration of FIGS. 8H-8N, reweigh may be captured through the embedded scale 148, dimensions 218, 220, 222 may be applied by manual input using the GUI, device 156, and assessorial characteristics—e.g., service type (9:00 am service, 10:30 am service, weekend service, etc.) 224, 226, 228, weight information 212, dimensional information 218, 220, 222, dangerous goods information 230, and any other unique freight/package characteristics for which the customer may be billed—may be assigned by manual input using the GUI device 156.

As may be appreciated by a consideration of FIGS. 1-5 and 8I-8N, the cart 100 preferably also allows the operator to apply the following parcel delivery "assessorial attributes" or characteristics and processes to packages 60: (a) special services; and/or (b) a special handling surcharge (SHS)—either by (i) scanning a service sticker (not shown) affixed to the package 60 or carried by the user, e.g., post barcode scan and pre-weight acquisition; and/or (b) by use of the GUI device 156. According to the invention, the "assessorial attributes" may thus be preferably added into the data string associated with each of the packages 60.

The processors 142 merge scan and recovery data. Information concerning the packages 60 (e.g., package ID numbers 210, associated services and surcharges, and origin, location and/or destination information)—including the total number 216 of packages 60 and other item data—is preferably transmitted to the database 190a, 190b from the cart 100. In this manner, the merged data may be transmitted to tracking and billing functions integrated within a larger operation, for example, at the facility 70a or across multiple facilities 70b, 70c. These functions may, for example and according to some embodiments of the invention, be "backend" functions in the sense that they may not be performed onsite and/or local to other functions associated with the system 50. The database 190a, 190b provides integration functionality and stores the item weight 212 and the other item data associated with the items 60.

The system 50 enables containerization tracking, whereby each package 60 is assigned a cart ID number, and subsequent tracking of the cart 100 applies its location to each package 60 carried thereby. This containerization tracking functionality enables cart 100 events to be applied to the contents (i.e., packages 60) thereof. Preferably, and as may be appreciated from a consideration of FIG. 11, the database processor 192 and/or the other processors 142 may be operatively encoded with one or more algorithms 196 which provide the system 50 with containerization tracking functionality. That is, the database processor 192 and/or the other processors 142 are preferably operatively encoded with one or more containerization functionality algorithms 196—which are shown in FIG. 11 as being stored in the cart memory 144 and in a database memory 194 which interfaces with the database processor 192. As such, the database processor 192 is adapted to use cart location data, which it receives for the cart 100, to automatically determine item location data for each item 60 carried by the cart 100. The database 190a, 190b stores the item location data in association with each item 60 carried by the cart 100 to enable tracking of the items 60 within the facility 70a, 70b, 70c. Preferably in this manner, the containerization functionality algorithms 196 enable the database processor 192 and/or the other processors 142 to assign container/bin identification data to each package 60 placed in a bin 104. Thereafter, the system 50 may track each bin/container 104, with associated tracking information then being applied to each package 60 placed therein.

According to some embodiments of the invention, the system 50 may enable real-time "visibility" scanning—a feature enabling customers and other authorized users to track packages 60 following scanning events.

The cart 100 and system 50 software provided according to and/or in conjunction with the present invention preferably conform to the parcel delivery network's on-site and/or other backend processes to ensure proper billing and visibility.

It may be worthwhile to again note that, according to some alternate embodiments of the invention, all or part of the database 190*a*, 190*b* and one or more database processors 192 may be located locally and/or onboard the cart 100. Also as aforesaid, in some embodiments of the invention, the database 190*a*, 190*b* may take the form of one or more congruent and/or distributed databases, such as, for example, also including one or more sets of congruently inter-related databases.

According to some other embodiments of the invention, client server configurations are available where many carts 100—each maintaining some functionality for data capture and weight recordal—communicate with a single set of processors 142 (located locally and/or remotely to all of the carts 100) which then integrate and merge the information. Each cart 100 and scanner 136 could additionally transmit to the processors 142 a unique identifier to enable them to distinguish between the various carts 100 and scanners 136.

Figure 8A:
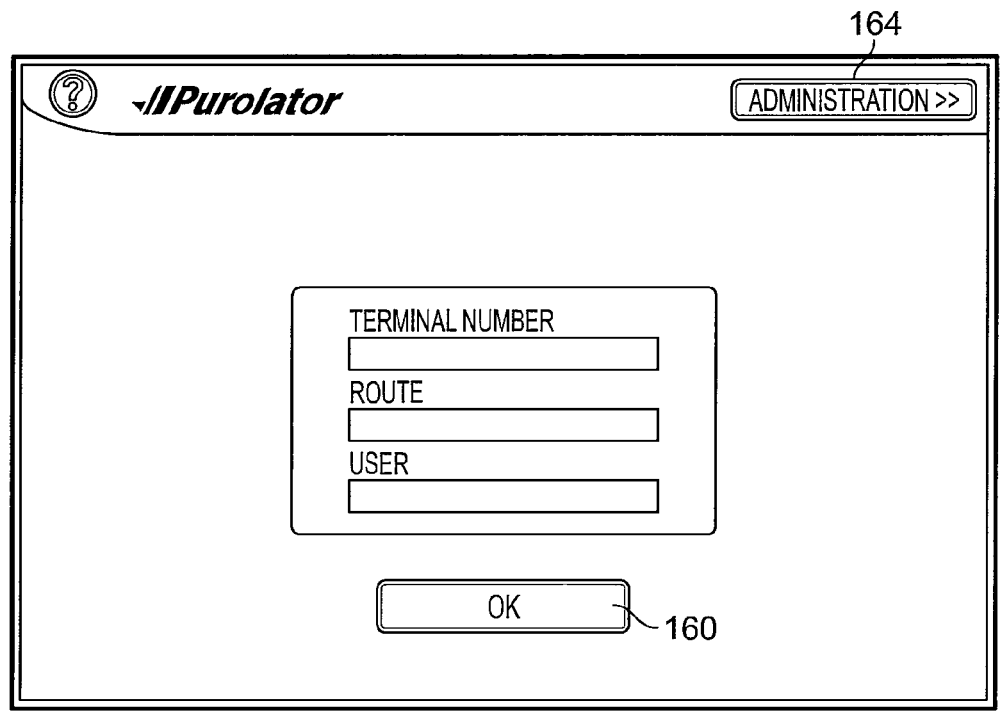
FIG. 8A is a blank login interface presented by a graphical user interface ("GUI") device of the cart of FIG. 1.
Figure 8B:
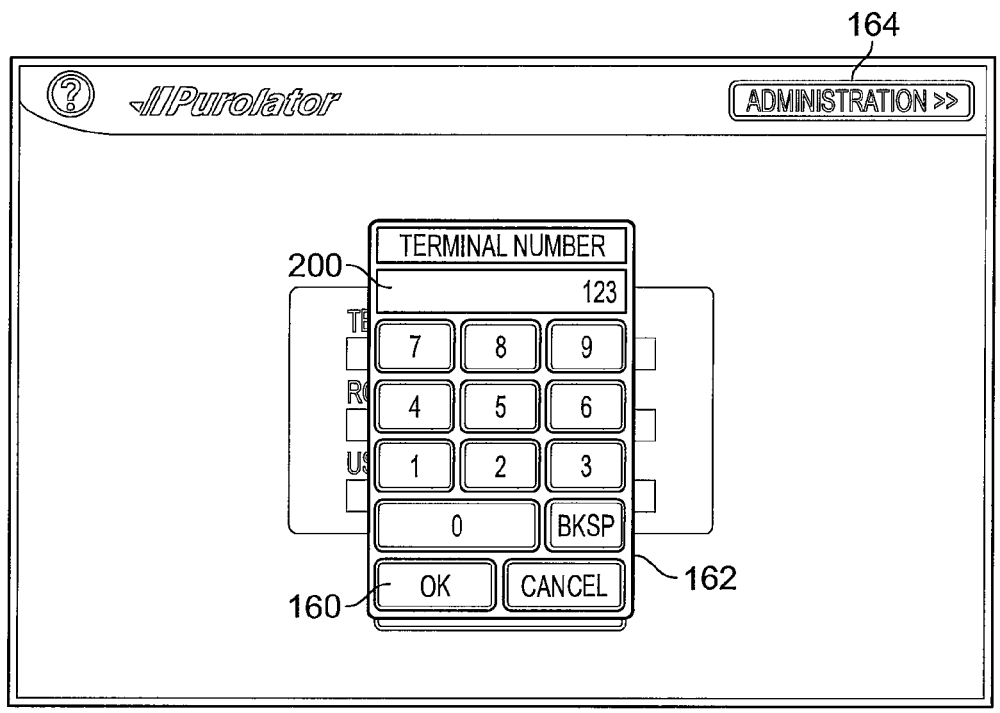
FIG. 8B is a terminal number interface presented by the GUI device of FIG. 8A.
Figure 8C:
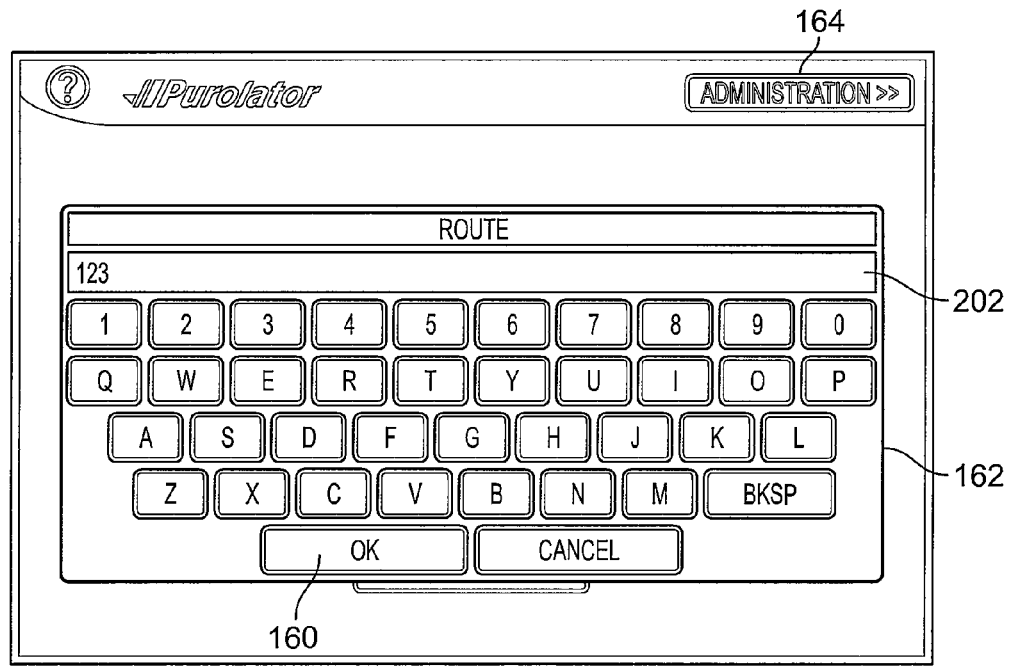
FIG. 8C is a route interface presented by the GUI device of FIG. 8A.
Figure 8D:
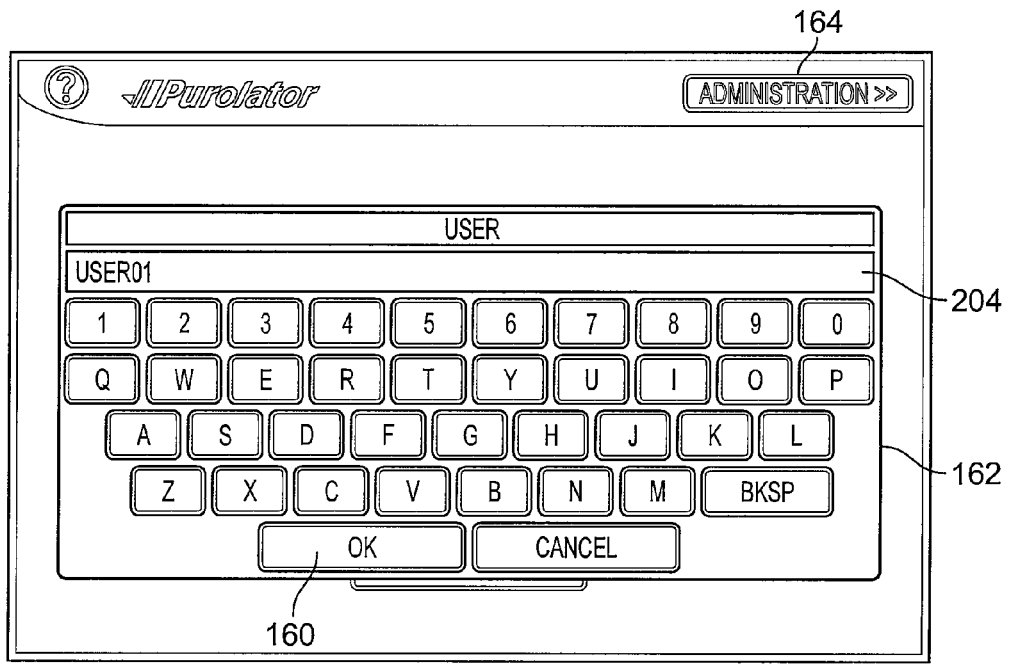
FIG. 8D is a user interface presented by the GUI device of FIG. 8A.
Figure 8E:
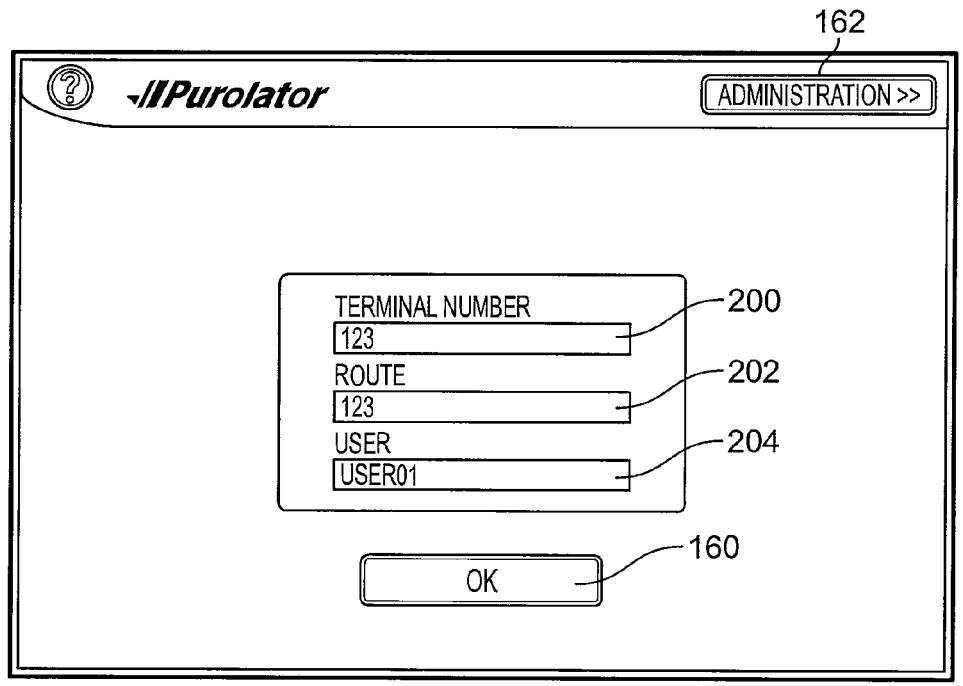
FIG. 8E is a filled-in login interface presented by the GUI device of FIG. 8A.
Figure 8F:
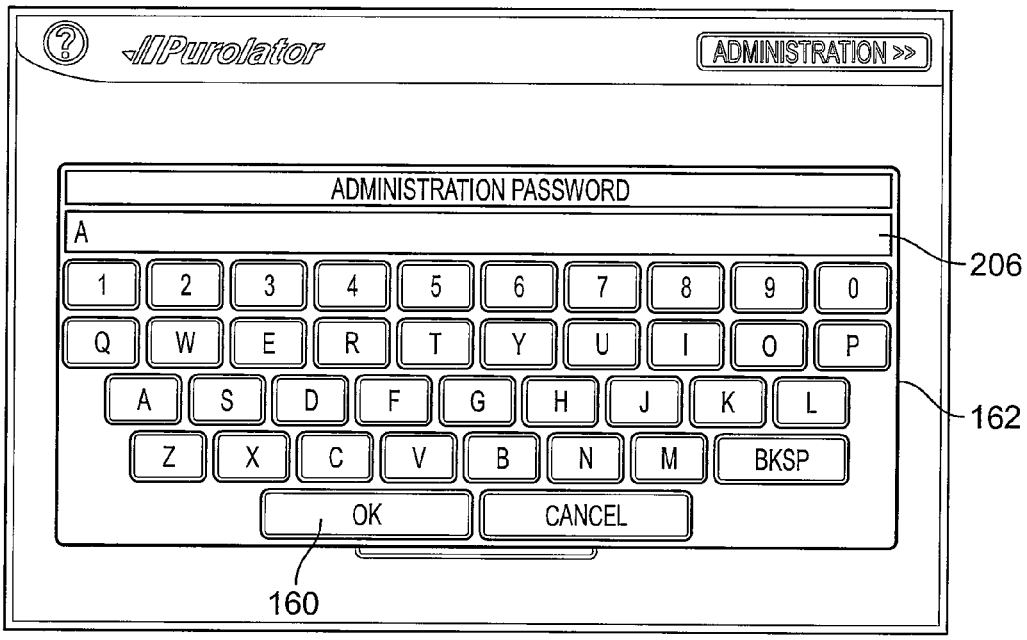
FIG. 8F is an administration password interface presented by the GUI device of FIG. 8A.
Figure 8G:
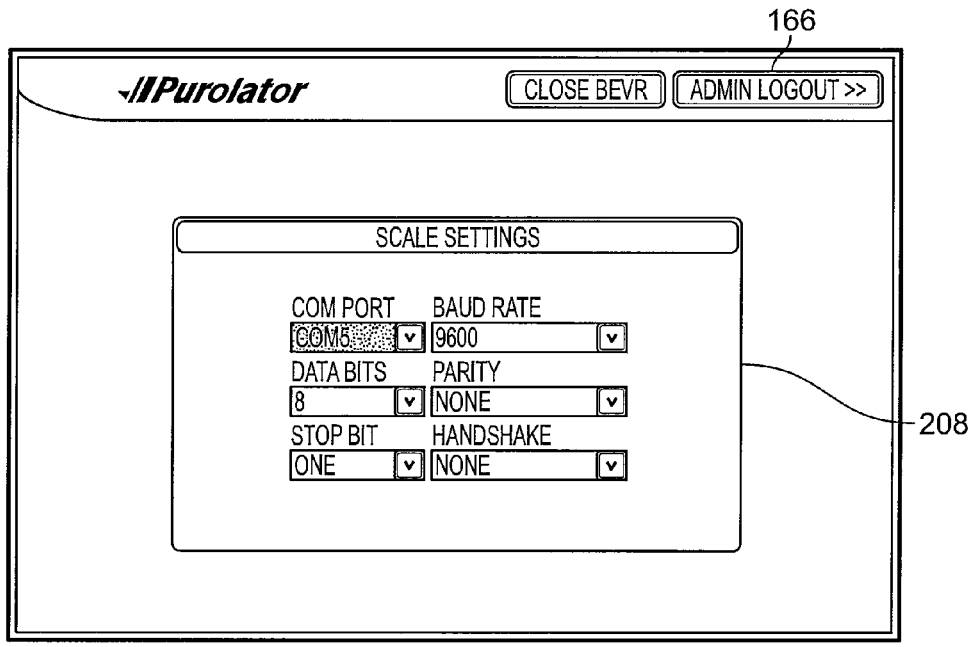
FIG. 8G is an administrative scale settings interface presented by the GUI device of FIG. 8A.
Figure 8H:
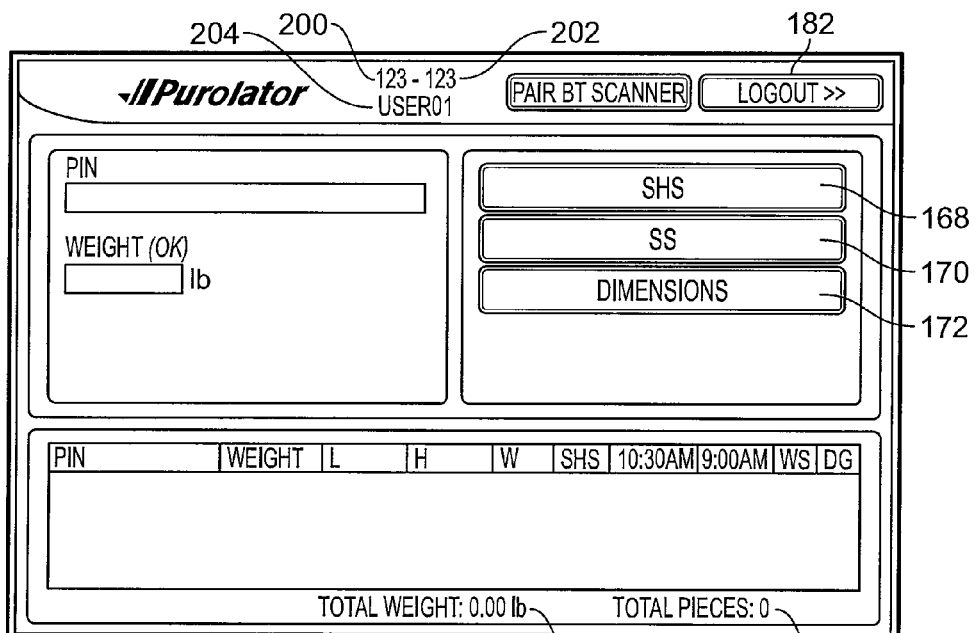
FIG. 8H is a blank item record interface presented by the GUI device of FIG. 8A.
Figure 8I:
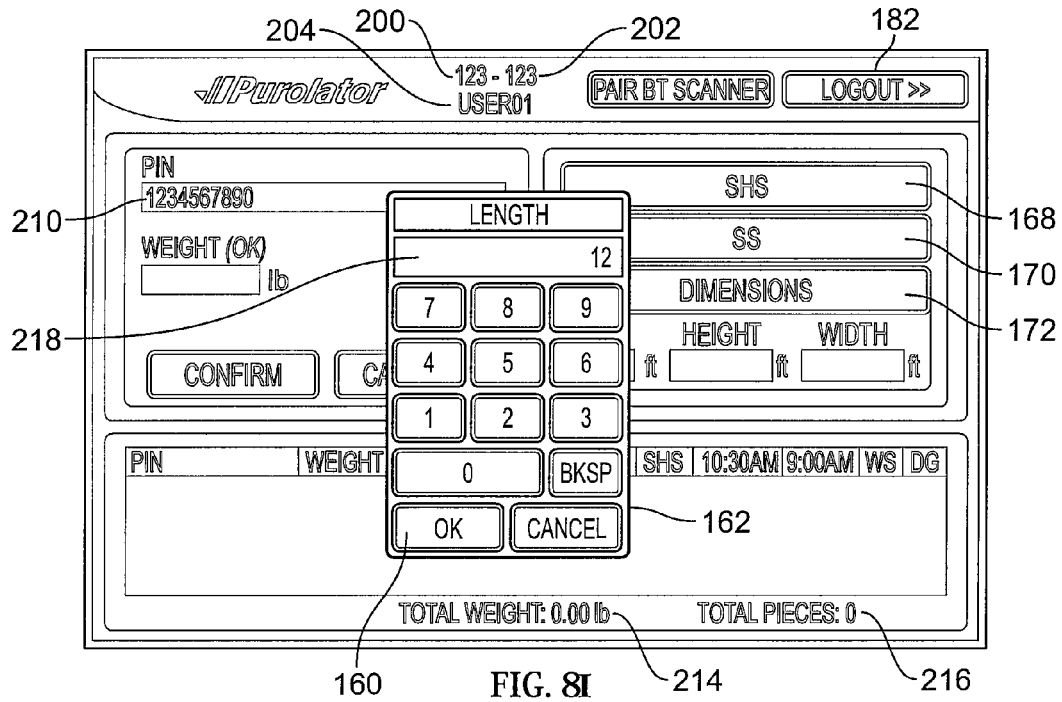
FIG. 8I is an item length interface presented by the GUI device of FIG. 8A.
Figure 8J:
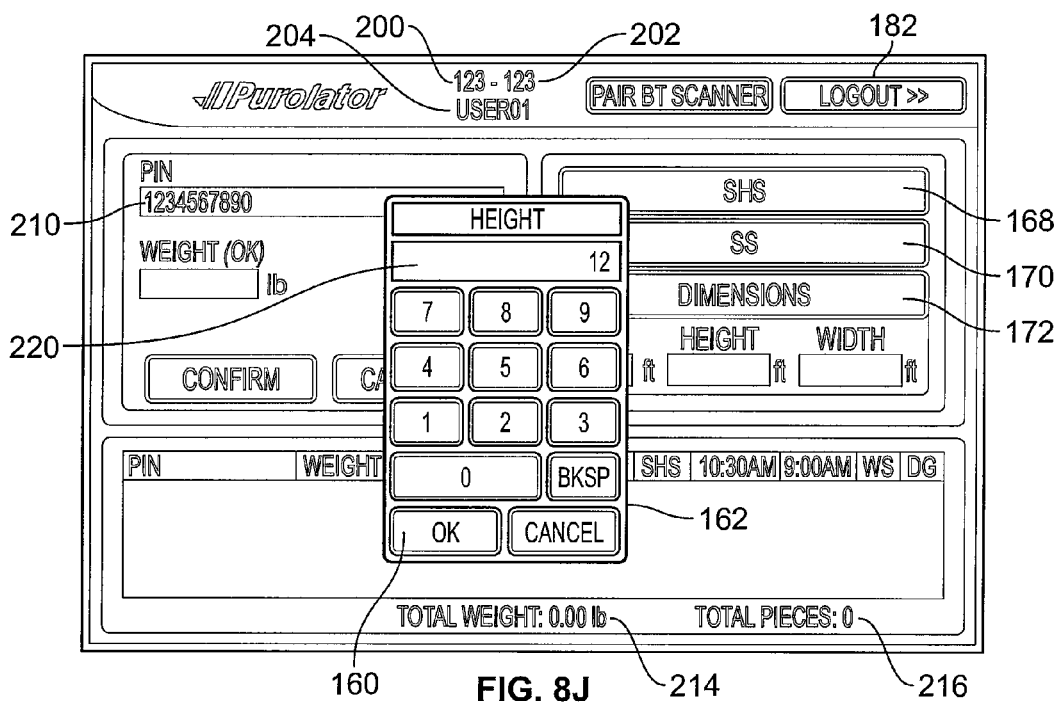
FIG. 8J is an item height interface presented by the GUI device of FIG. 8A.
Figure 8K:
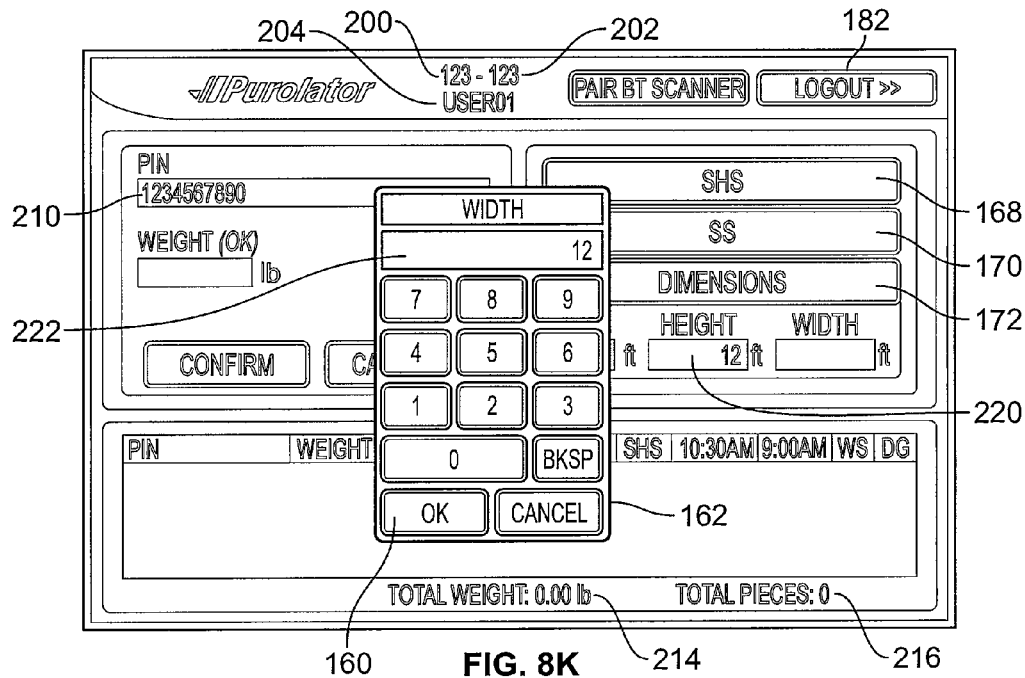
FIG. 8K is an item width interface presented by the GUI device of FIG. 8A.
Figure 8L:
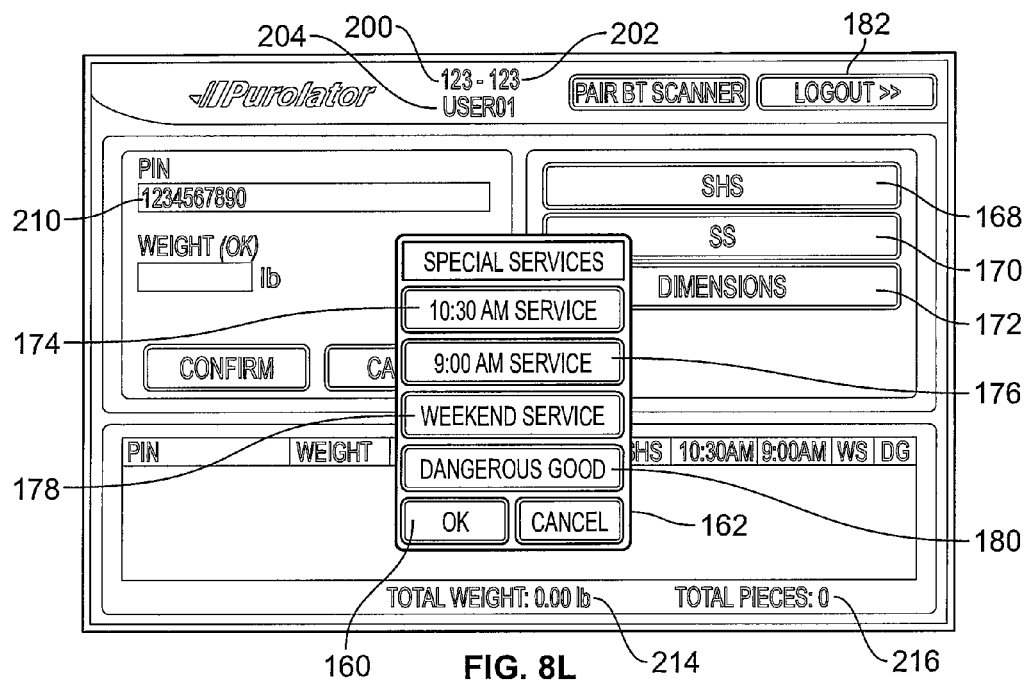
FIG. 8L is a special services interface presented by the GUI device of FIG. 8A.
Figure 8M:
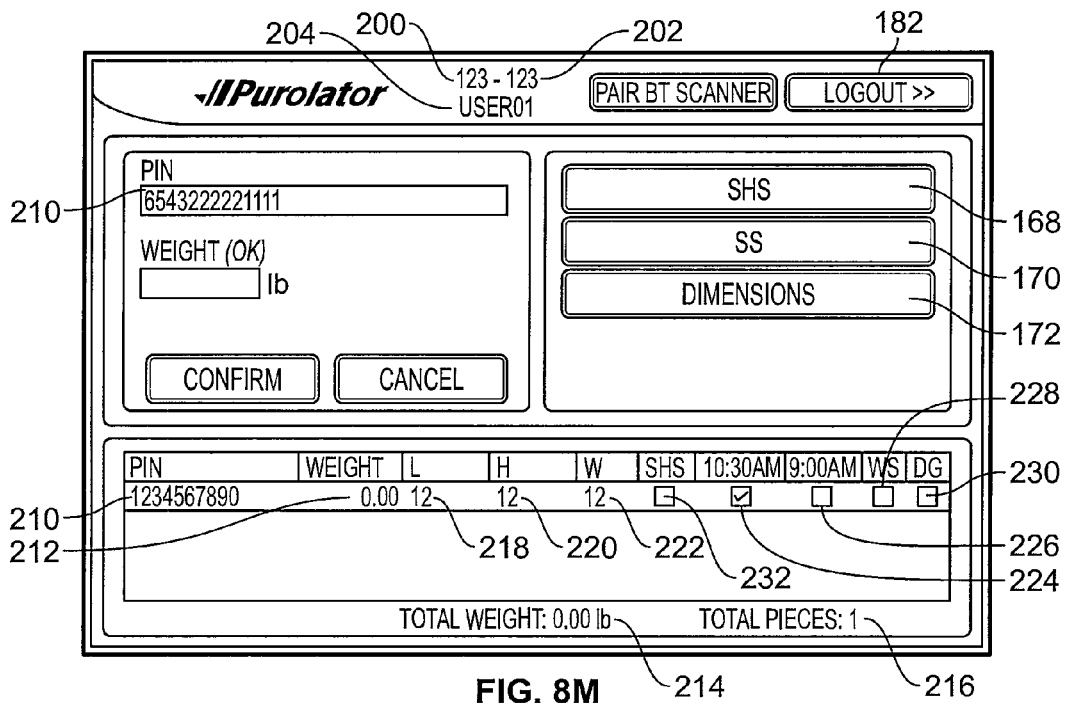
FIG. 8M is another representation of the item record interface of FIG. 8H, showing an item record.
Figure 8N:
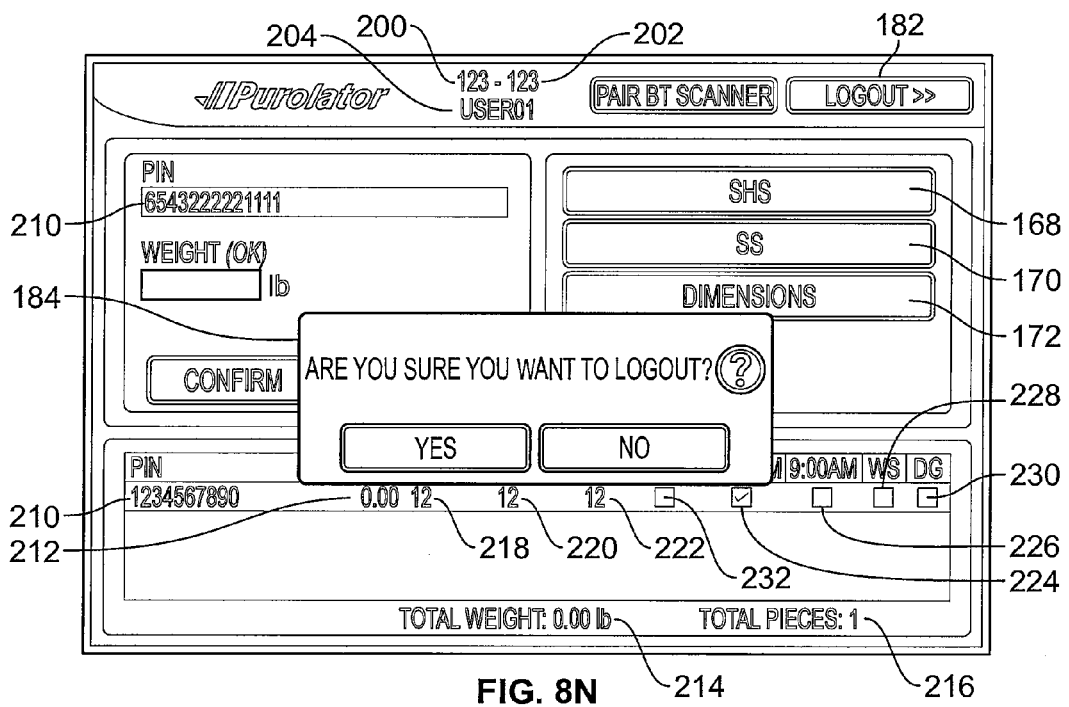
FIG. 8N is a logout interface presented by the GUI device of FIG. 8A.

Each one of FIGS. 8A-8N is a graphical representation of an interface which may preferably be presented by the GUI device 156. FIG. 5A graphically represents a blank login interface including, among other things, an 'OK' button 160. An onscreen keypad 162 is graphically represented as part of various interfaces, including those shown in FIGS. 8B-8D, 8F and 8I-8L, and each may typically include an 'OK' button 160 to enter any keyed-in information and close the keypad 162. FIG. 8B graphically represents a terminal number interface including, among other things, entered terminal number data 200. FIG. 8C graphically represents a route interface including, among other things, entered route data 202. FIG. 5D graphically represents a user interface including, among other things, entered user data 204. FIG. 8E graphically represents the login interface including, among other things, the terminal number data 200, the route data 202 and the user data 204 which has been filled-in, as well as an administration login button 164.

FIG. 8F graphically represents an administration password interface including, among other things, entered administration password data 206. FIG. 8G graphically represents an administrative scale settings interface including, among other things, configurable scale settings data 208 and an administration logout button 166.

FIG. 8H graphically represents a blank item record interface including, among other things, the entered terminal number data 200, route data 202, and user data 204, as well as a special handling surcharge ("SHS") application button 168, a special services entry button 170 and a dimension entry button 172. FIG. 8I graphically represents an item length interface including, among other things, entered length data 218. FIG. 8J graphically represents an item height interface including, among other things, entered height data 220. FIG. 8K graphically represents an item width interface including, among other things, entered width data 222 (and height data 220).

FIGS. 8H-8N also graphically represent, among other things, cumulative weight data 214 and total number of packages data 216. FIGS. 8I-8N also graphically represent, among other things, package identification number ("PIN") data 210.

FIG. 8L graphically represents a special services interface including, among other things, a 10:30 am service button 174, a 9:00 am service button 176, a weekend service button 178, and a dangerous goods button 180.

FIG. 8M graphically represents the item record interface including, among other things, an item record for one item, the entered length data 218, height data 220, width data 222, and 10:30 am service data 224, including as well fields for entry of 9:00 am service data 226, weekend service data 228, dangerous goods data 230, and special handling surcharge data 232. FIG. 8M also graphically represents a logout button 182.

FIG. 8N graphically represents a logout interface including, among other things, a logout confirmation window 184.

Figure 9:
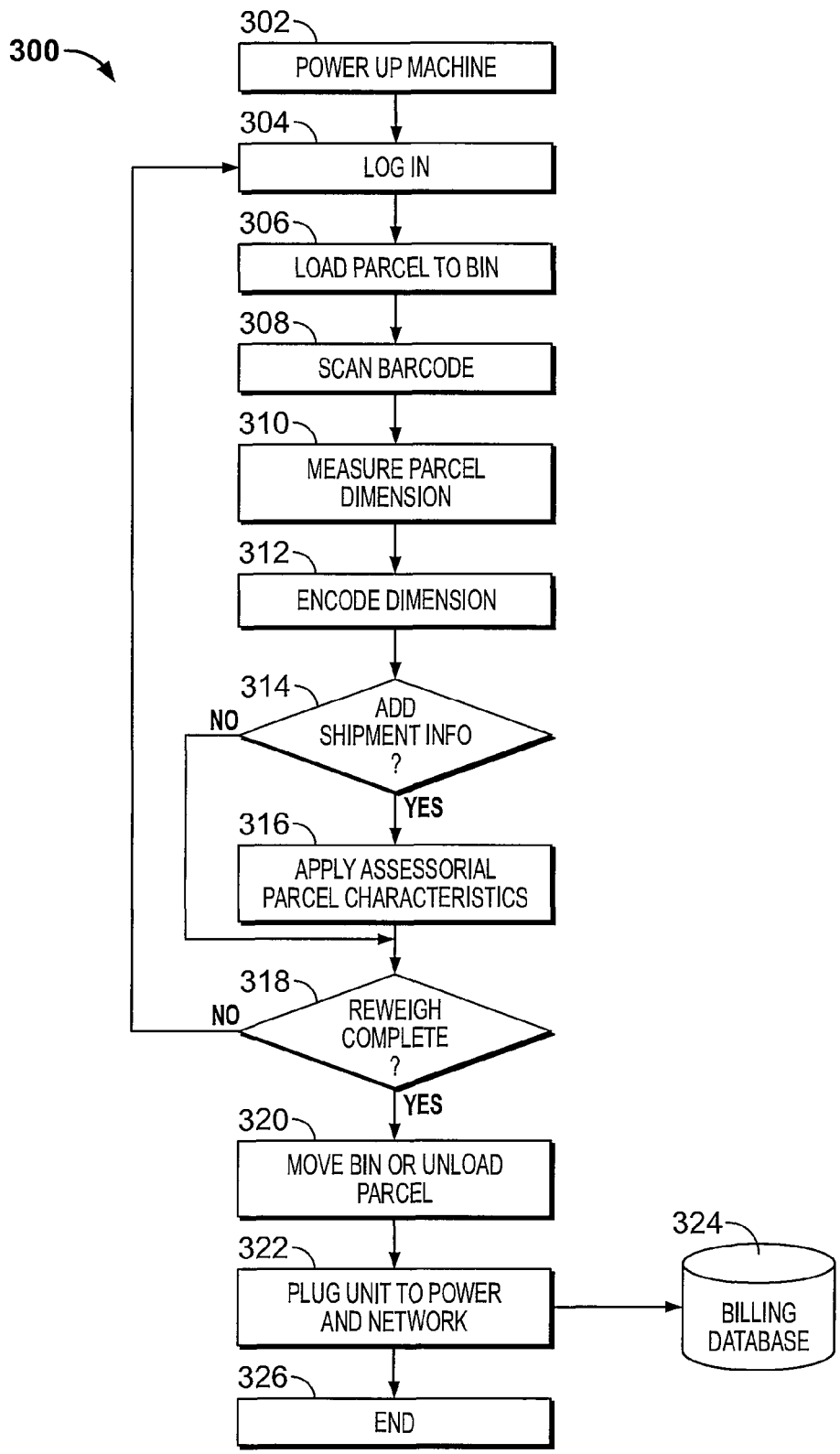
FIG. 9 is a flowchart of an illustrative method of transferring items to and from a cart according to a preferred embodiment of the invention.

FIG. 9 depicts selected steps of a corresponding method 300 for transferring an item 60 to and from the cart 100 for moving the items 60 within the facility 70*a*, 70*b*, 70*c*. In the description of the method 300 which follows, the same reference numerals are used as those which are used, above, with reference to the system 50. The method 300 is suitable for use with the system 50 described above and shown in FIGS. 1-8N and 10-11, but it is not so limited.

The method 300 includes the following steps, among others: a power up step 302, a login step 304, an identification step 308, a transfer step 306, a measure parcel step 310, an inspection step, a weighing step 318, a calculation step after the weighing step 318, a transmission step 322 after the calculation step, a display/input step 312, 314, 316 (including an encode dimension step 312, an add shipment information query 314, and an apply assessorial parcel characteristics step 316), a move bin or unload parcel step 320, a cart locating step, a database processing step, a database storage step 324, and an end method step 326.

In the power up step 302, the cart 100 is powered. In the login step 304, a user then enters the requisite login information—e.g., the terminal number data 200, the route data 202 and the user data 204. In the transfer step 306, the user begins transfer of a package 60 to the bin 104. In doing so, preferably before actually completing transfer of the package 60 into the bin 104, the user performs the identification step 308. In the identification step 308, the identification reader 136 is used to read the identification tag 62 of one of the items 60. (Sometime after the identification step 308 and before the calculation step, the identification reader 136 communicates the identification tag 62 to the processors 142, preferably wirelessly.)

Next, according to some preferred embodiments of the invention, the user proceeds through the measure parcel step 310 and part of the display/input step 312 by measurement and entry of the length data 218, the height data 220 and the width data 222, if desired and/or appropriate.

The method 300 and the display/input step 312, 314, 316 preferably then provide for the add shipment information query 314. If answered in the affirmative, the method 300 will preferably then proceed to the apply assessorial parcel characteristics step 316 of the display/input step 312, 314, 316 wherein the special handling surcharge data 232, the 10:30 am service data 224, the 9:00 am service data 226, the weekend service data 228, and/or the dangerous goods data 230 may be selectively entered by the user.

The display/input step 312, 314, 316 occurs sometime after the identification step 308. In the display/input step 312, 314, 316, the graphical user interface device 156 is used to display and/or input the item weight 212 and/or the other item data associated with the aforesaid one of the items 60. In the display/input step 312, 314, 316, the graphical user interface device 156 displays a total number 216 of the items 60 (a) which are carried by the mobile carriage assembly 102, (b) for which the cumulative weight 214 has been measured, and/or (c) for which the identification tag 62 has been read. The other item data is preferably transmitted to the database 190*a*, 190*b* in the transmission step 322 and/or received from the database 190*a*, 190*b* in the display/input step 312, 314, 316.

To complete the transfer step 306, the item 60 is transferred to (or, during "skid breakdown", from) the mobile carriage assembly 102. The item 60 is preferably transferred over the low sidewall portions 112, 114 to facilitate its transfer to or from the mobile carriage assembly 102. When the item 60 is transferred to the mobile carriage assembly 102, the identification step 308 is preferably performed before completion of the transfer step 306. (And, conversely, when the item 60 is transferred from the mobile carriage assembly 102, the identification step 308 is performed after initiation and/or completion of the transfer step 306.)

In the inspection step, which may be performed at virtually any time, a visual inspection of the items 60 carried by the mobile carriage assembly 102 is conducted through the mesh material 118.

In the weighing step 318, the onboard scale 148 is used to automatically measure a cumulative weight 214 of all items 60 carried by the mobile carriage assembly 102 before and after the aforesaid one of the items 60 is transferred to or from the mobile carriage assembly 102. After the weighing step 318, in the calculation step, the processors 142 are used to automatically determine an item weight 212 of the item 60 by a change in the cumulative weight 214 after the transfer step 306.

The weighing step 318 of the method 300 may preferably include a query as to whether the re-weigh is complete, or this query may be performed after the weighing step 318. The processors 142 may preferably assess the re-weigh to be complete after the scale 148 has sensed a change in the cumulative weight 214. The processors 142 may on the other hand preferably assess the re-weigh to be incomplete when the scale 148 has not sensed a change in the cumulative weight 214. If the re-weigh is incomplete, the method 300 may preferably proceed to one of the preceding steps—i.e., the login step 304 according to some preferred embodiments of the invention—thus, requiring some or all of the preceding steps of the method 300 to be again performed. Conversely, if the re-weigh is complete, the method 300 may proceed to the move bin or unload parcel step 320. In this step 320, the user may selectively relocate the cart 100 (and, if desired and/or appropriate, even load more parcels 60), and/or unload the parcels 60.

In the transmission step 322, the wireless transmitter 152 wirelessly transmits the item weight 212 for remote storage in the database 190*a*, 190*b* in association with the item 60. The total number 216 is also transmitted to the database 190*a*, 190*b*. (In some alternate embodiments of the method, in the transmission step 322, at least a part of the database 190*a*, 190*b* is locally stored in at least one memory 144 which is provided onboard the cart 100.) The cart 100 may also be re-charged, as may be the identification reader 136.

In the cart locating step, the database processor 192 is used to receive cart location data for the cart 100. In the database processing step, the cart location data and the database processor 192 are used to automatically determine item location data for each item 60 carried by the cart 100. In the database storage step 324, the item location data—along with the PIN data 210, the item weight data 212, the cumulative weight data 214, the total number of packages data 216, the length data 218, the height data 220, the width data 222, the special handling surcharge data 232, the 10:30 am service data 224, the 9:00 am service data 226, the weekend service data 228, the dangerous goods data 230 and/or any other item data—is stored in the database 190*a*, 190*b* in association with each item 60 carried by the cart 100 to enable tracking of the items 60 within the facility 70*a*, 70*b*, 70*c*.

At the end of the method 300, the end method step 326 is performed wherein the cart may be powered down.

In use, an operator of the cart 100 picks up a package 60 (one per transaction), scans it using the hand scanner 136, and places the package 60 in the bin 104 of the cart 100. During this "skid build" operation, the processors 142 receive information concerning the identification tag (e.g., barcode) 62 of the package 60, then incrementally calculate a weight 212 for the package 60, and consolidate the information onboard the cart 100 before transmission to the database 190*a*, 190*b*. Using the cart 100, the operator can also remove a package 60 from the bin 104 (one per transaction), scan it using the hand scanner 136, and leave the package 60 at the then current location of the cart 100. During this "skid breakdown" operation, the processors 142 receive information concerning the identification tag (e.g., barcode) 62 of the package 60, then decrementally calculate a weight 212 for the package 60, and consolidate the information onboard the cart 100 before transmission to the database 190*a*, 190*b*. The database 190*a*, 190*b* may be located onboard the cart 100, 100', 100", remotely of the cart 100, 100', 100", and/or on-site at the same facility 70*c* as the cart 100, 100', 100". When the database 190*a*, 190*b* is located remotely or on-site, the transmission occurs wirelessly. In use, the cart 100 also enables additional transactions to be entered into the system 50 such as package dimensions 218, 220, 222 and assessorial characteristics.

The cart 100, system 50 and method 300 are preferably adapted and/or adaptable for use in (1) parcel delivery and postal applications, (2) in airports and with airlines, (3) supply chain management, and (4) grocery stores. In parcel delivery and postal applications, the cart, system and method are preferably adapted (a) for transport of non-conveyable freight items or bulk freight items that bypass conveyors to trailers, (b) for transport of parcels where no conveyor exists, and to improve or facilitate (c) specialized sorts (e.g., dangerous goods, air sorts), (d) skid breakdown or build, and (e) reweigh and movement of specific and applicable freight. In parcel delivery networks, the cart, system and method may be employed at each of the numerous locations and terminals across North America. In airports and with airlines, the cart, system and method are preferably adapted (f) for use with baggage trolleys, and/or to improve or facilitate (g) weighing and movement of oversized baggage and (h) air cans. In supply chain management, the cart, system and method are preferably adapted for (i) pick and pack and reverse pick and pack operations, and (j) weigh and movement of products (e.g., regular and oversized products). In grocery stores, the cart, system and method are preferably adapted for use in (k) weigh and movement of produce, and (l) inventory management.

This concludes the description of presently preferred embodiments of the invention. The foregoing description has been presented for the purpose of illustration and is not intended to be exhaustive or to limit the invention to the precise form disclosed. Other modifications, variations and alterations are possible in light of the above teaching and will be apparent to those skilled in the art, and may be used in the design and manufacture of other embodiments according to the present invention without departing from the spirit and scope of the invention. It is intended the scope of the invention be limited not by this description but only by the claims forming a part hereof.

What is claimed is:

1. A cart for moving items within a facility and for use with a database of information associated with the items, each of the items having an item weight to be determined and a unique identification tag, the cart comprising:

(a) a mobile carriage assembly adapted to carry and move the items;

(b) an onboard scale adapted to measure a cumulative weight of the items carried by the mobile carriage assembly;
(c) an identification reader adapted to read the identification tag of one of the items; and
(d) one or more processors adapted to automatically determine the item weight of said one of the items:
  (i) by a change in the cumulative weight after said one of the items is transferred to the mobile carriage assembly; and
  (ii) by a change in the cumulative weight after said one of the items is transferred from the mobile carriage assembly; and
wherein the item weight, determined as aforesaid, is transmitted for storage in the database in association with said one of the items; and
wherein attributes for additional charges to the customer are recovered when the item weight, determined as aforesaid, is greater than any said item weight previously stored in the database in association with said one of the items.

2. A cart according to claim 1 wherein, when said one of the items is to be transferred to the mobile carriage assembly, the identification reader is adapted to read the identification tag before said one of the items is transferred to the mobile carriage assembly.

3. A cart according to claim 1 wherein, when said one of the items is transferred from the mobile carriage assembly, the identification reader is adapted to read the identification tag after said one of the items is transferred from the mobile carriage assembly.

4. A cart according to claim 1, further comprising an onboard battery to power the processors.

5. A cart according to claim 4, wherein the onboard battery is rechargeable.

6. A cart according to claim 1, wherein the mobile carriage assembly comprises a plurality of low friction castors to enable rollable movement of the cart.

7. A cart according to claim 1, wherein the identification reader is a handheld identification reader.

8. A cart according to claim 1, wherein the identification reader is a barcode scanner.

9. A cart according to claim 1, further comprising a handle to move and direct the mobile carriage assembly, and a cradle located near the handle to removably receive and hold the identification reader.

10. A cart according to claim 9, wherein the identification reader comprises a rechargeable reader battery, and wherein the cradle is adapted to charge the rechargeable reader battery when the cradle receives the identification reader.

11. A cart according to claim 1 wherein, for said one of the items, the identification reader wirelessly communicates the identification tag to the processors.

12. A cart according to claim 1, further comprising a wireless transmitter to wirelessly transmit the item weight for remote storage in the database.

13. A cart according to claim 1, further comprising a graphical user interface device mounted to the mobile carriage assembly to enable display and/or input of the item weight and/or other item data associated with said one of the items.

14. A cart according to claim 13, wherein the other item data comprises dimensional data, origin data, destination data, delivery data, and/or handling data.

15. A cart according to claim 13, wherein the other item data is transmitted to and/or received from the database.

16. A cart according to claim 13, wherein the graphical user interface device displays a total number of the items (a) which are carried by the mobile carriage assembly, (b) for which the cumulative weight has been measured, and/or (c) for which the identification tag has been read.

17. A cart according to claim 16, wherein the total number is transmitted to the database.

18. A cart according to claim 13, wherein the graphical user interface device comprises a touchscreen.

19. A cart according to claim 1, further comprising at least one memory for local storage of at least a part of the database.

20. A cart according to claim 1, wherein the mobile carriage assembly comprises a bin having a bottom portion to carry the items, and one or more sidewall portions extending upwardly from the bottom portion.

21. A cart according to claim 20, wherein the bin has at least two of the sidewall portions, and at least one of the sidewall portions extends lower than another one of the side wall portions, to facilitate loading and unloading of the items carried by the mobile carriage assembly.

22. A cart according to claim 20, wherein the bin has four of the sidewall portions, and two of the sidewall portions extend lower than the other two, to facilitate loading and unloading of the items carried by the mobile carriage assembly.

23. A cart according to claim 22, wherein said two of the sidewall portions are adjacent to one another, to facilitate loading and unloading of the items carried by the mobile carriage assembly.

24. A cart according to claim 20, wherein the sidewall portions are constructed from a mesh material to facilitate visual inspection of the items carried by the mobile carriage assembly.

25. A cart according to claim 1, wherein the mobile carriage assembly comprises an unwalled flat bed portion to carry the items.

26. A cart according to claim 1, wherein the mobile carriage assembly comprises an A-shaped supporting rack to carry the items.

27. A system for moving items within a facility, with each of the items having an item weight to be determined, the system comprising:
(a) a unique identification tag associated with each of the items;
(b) a database of information associated with the items; and
(c) at least one cart comprising:
  (i) a mobile carriage assembly adapted to carry and move the items;
  (ii) an onboard scale adapted to measure a cumulative weight of the items carried by the mobile carriage assembly;
  (iii) an identification reader adapted to read the identification tag associated with one of the items; and
  (iv) one or more processors adapted to automatically determine an item weight of said one of the items:
    by a change in the cumulative weight after said one of the items is transferred to the mobile carriage assembly; and
    by a change in the cumulative weight after said one of the items is transferred from the mobile carriage assembly; and
wherein the cart transmits the item weight for storage in the database in association with said one of the items; and
wherein attributes for additional charges to the customer are recovered when the item weight, determined as aforesaid, is greater than any said item weight previously stored in the database in association with said one of the items.

28. A system according to claim 27, wherein the database comprises the item weight and other item data associated with said one of the items, and wherein the cart further comprises a graphical user interface device mounted to the mobile carriage assembly to enable retrieval from the database, and display, of the item weight and/or the other item data associated with said one of the items.

29. A system according to claim 28, wherein the other item data comprises dimensional data, origin data, destination data, delivery data, and/or handling data associated with said one of the items.

30. A system according to claim 27, further comprising a database processor which is located remotely from the cart and adapted to receive cart location data for the cart in order to automatically determine item location data for each said one of the items carried by the cart; and wherein the database stores the item location data in association with each said one of the items carried by the cart to enable tracking of the items within the facility.

31. A method of transferring items to and from a cart for moving the items within a facility, with each of the items having an item weight to be determined and a unique identification tag, with the cart provided with a mobile carriage assembly, an identification reader, an onboard scale, and one or more processors, and with the method being for use with a database of information associated with the items, the method comprising:
  (a) an identification step of using the identification reader to read the identification tag of one of the items;
  (b) a transfer step of transferring said one of the items to or from the mobile carriage assembly;
  (c) a weighing step of using the onboard scale to automatically measure a cumulative weight of the items carried by the mobile carriage assembly before and after the transfer step;
  (d) a calculation step, after the weighing step, of using the processors to automatically determine an item weight of said one of the items by a change in the cumulative weight after the transfer step;
  (e) a transmission step, after the calculation step, of transmitting the item weight for storage in the database in association with said one of the items; and
  wherein when said one of the items is transferred to the mobile carriage assembly, the identification step is performed before the transfer step;
  wherein when said one of the items is transferred from the mobile carriage assembly, the identification step is performed after the transfer step; and
  wherein, after the transmission step, attributes for additional charges to the customer are recovered when the item weight, determined as aforesaid, is greater than any said item weight previously stored in the database in association with said one of the items.

32. A method according to claim 31, wherein after the identification step and before the calculation step, the identification reader wirelessly communicates the identification tag to the processors.

33. A method according to claim 31, wherein in the transmission step, a wireless transmitter provided on the cart wirelessly transmits the item weight for remote storage in the database.

34. A method according to claim 31, further comprising a display/input step, after the identification step, of using a graphical user interface device mounted to the mobile carriage assembly to display and/or input the item weight and/or other item data associated with said one of the items.

35. A method according to claim 34, wherein in the display/input step, the other item data comprises dimensional data, origin data, destination data, delivery data, and/or handling data.

36. A method according to claim 34, wherein the other item data is transmitted to the database in the transmission step and/or received from the database in the display/input step.

37. A method according to claim 34, wherein in the display/input step, the graphical user interface device displays a total number of the items (a) which are carried by the mobile carriage assembly, (b) for which the cumulative weight has been measured, and/or (c) for which the identification tag has been read.

38. A method according to claim 37, wherein in the transmission step, the total number is transmitted to the database.

39. A method according to claim 31, wherein in the transmission step, at least a part of the database is locally stored in at least one memory which is provided onboard the cart.

40. A method according to claim 31, wherein the mobile carriage assembly is provided with a bin having a bottom portion to carry the items and at least two sidewall portions extending upwardly from the bottom portion, with at least one of the sidewall portions extending lower than another one of the side wall portions, and wherein in the transfer step, said one of the items is transferred over said at least one of the sidewall portions to facilitate transfer of said one of the items to or from the mobile carriage assembly.

41. A method according to claim 40, wherein the bin has four of the sidewall portions, with two adjacent ones of the sidewall portions extending lower than the other two, and wherein in the transfer step, said one of the items is transferred over said two adjacent ones of the sidewall portions to facilitate transfer of said one of the items to or from the mobile carriage assembly.

42. A method according to claim 40, wherein the sidewall portions are constructed from a mesh material, and wherein the method further comprises an inspection step of conducting a visual inspection through the mesh material of the items carried by the mobile carriage assembly.

43. A method according to claim 31, further comprising a cart locating step of using a database processor located remotely from the cart to receive cart location data for the cart; further comprising a database processing step of using the cart location data and the database processor to automatically determine item location data for each said one of the items carried by the cart; and further comprising a database storage step of storing the item location data in the database in association with each said one of the items carried by the cart to enable tracking of the items within the facility.

* * * * *